(12) United States Patent
Lvov et al.

(10) Patent No.: US 10,719,656 B2
(45) Date of Patent: Jul. 21, 2020

(54) TRIPLE AND QUAD COLORING OF SHAPE LAYOUTS

(71) Applicant: International Business Machines Corporation, Armonk, NY (US)

(72) Inventors: Alexey Y. Lvov, Congers, NY (US); Gi-Joon Nam, Chappaqua, NY (US); Gustavo Enrique Tellez, Essex Junction, VT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/288,956

(22) Filed: Feb. 28, 2019

(65) Prior Publication Data

US 2019/0197215 A1  Jun. 27, 2019

Related U.S. Application Data

(63) Continuation of application No. 15/466,525, filed on Mar. 22, 2017, now Pat. No. 10,223,496.

(60) Provisional application No. 62/424,949, filed on Nov. 21, 2016.

(51) Int. Cl.
   *G06F 17/50* (2006.01)
   *G06F 30/398* (2020.01)
   *G06T 11/00* (2006.01)
   *G06T 11/20* (2006.01)
   *G06F 111/04* (2020.01)

(52) U.S. Cl.
   CPC .......... *G06F 30/398* (2020.01); *G06T 11/001* (2013.01); *G06T 11/206* (2013.01); *G06F 2111/04* (2020.01)

(58) Field of Classification Search
   CPC .................................................. G06F 17/5081
   USPC ........................................................... 716/52
   See application file for complete search history.

(56) References Cited

U.S. PATENT DOCUMENTS

| | | | |
|---|---|---|---|
| 7,687,207 B2 | 3/2010 | Graur et al. | |
| 8,375,348 B1* | 2/2013 | Raj | G06F 17/5018 716/126 |
| 8,434,043 B1* | 4/2013 | Hsu | G06F 17/5081 716/112 |
| 8,719,737 B1* | 5/2014 | Wang | G06F 30/398 716/52 |
| 8,949,747 B1 | 2/2015 | Wang | |
| 9,026,971 B1 | 5/2015 | Ho et al. | |
| 9,158,885 B1* | 10/2015 | Gray | G03F 7/70433 |
| 9,747,407 B2* | 8/2017 | Choi | G06F 17/5081 |
| 2011/0003254 A1 | 1/2011 | Chang et al. | |

(Continued)

OTHER PUBLICATIONS

List of IBM Patents or Applications Treated as Related.

(Continued)

*Primary Examiner* — Suchin Parihar
(74) *Attorney, Agent, or Firm* — Amin, Turocy & Watson, LLP

(57) ABSTRACT

Techniques related to triple and quad coloring of shape layouts are provided. A computer-implemented method comprises coloring, by a system operatively coupled to a processor, a shape layout with a plurality of colors in accordance with a defined design rule based on a determination that a first defined shape within the shape layout satisfies a layout specification and a second defined shape within the shape layout satisfies a defined rule.

18 Claims, 29 Drawing Sheets

(56) References Cited

U.S. PATENT DOCUMENTS

| | | | | |
|---|---|---|---|---|
| 2012/0131528 | A1* | 5/2012 | Chen | G06F 17/5077 716/112 |
| 2014/0075397 | A1* | 3/2014 | Agarwal | G03F 7/70283 716/52 |
| 2014/0282344 | A1 | 9/2014 | Hsu et al. | |
| 2015/0234974 | A1* | 8/2015 | Dechene | G03F 1/68 716/52 |
| 2015/0286771 | A1* | 10/2015 | Choi | G06F 17/5081 716/51 |
| 2016/0098509 | A1 | 4/2016 | Seo et al. | |
| 2018/0144082 | A1* | 5/2018 | Hanchinal | H01L 21/027 |

OTHER PUBLICATIONS

Hsu et al., "Non-stitch Triple Patterning-Aware Routing Based on Conflict Graph Pre-coloring," Asia and South Pacific Design Automation Conference, 2015, pp. 390-395, IEEE, 6 pages.

Fang et al.,"Layout Decomposition for Spacer-is-Metal (SIM) Self-Aligned Double Patterning," Asia and South Pacific Design Automation Conference, 2015, pp. 671-676, IEEE, 6 pages.

Fang et al., "A Novel Layout Decomposition Algorithm for Triple Patterning Lithography," IEEE Transactions on Computer-Aided Design of Integrated Circuits and Systems, Mar. 2014, pp. 397-408, vol. 33, No. 3, IEEE, 12 pages.

Hsu et al., "Simultaneous Layout Migration and Decomposition for Double Patterning Technology," IEEE Transactions on Computer-Aided Design of Integrated Circuits and Systems, Feb. 2011, pp. 284-294, vol. 30, No. 2, IEEE, 11 pages.

Zhang et al., "Layout Decomposition with Pairwise Coloring and Adaptive Multi-Start for Triple Patterning Lithography," ACM Transactions on Design Automation of Electronic Systems, Nov. 2015, vol. 21, No. 1, ACM 25 pages.

Yu et al., "Layout Decomposition for Triple Patterning," Encyclopedia of Algorithms, 2011, Springer Science+Business Media, 5 pages.

Yu et al., "Layout Decomposition for Triple Patterning Lithography," Proceedings of the International Conference on Computer-Aided Design, 2011, IEEE, 8 pages.

Gao et al., "Self-aligned Double Patterning Layout Decomposition with Complementary E-Beam Lithography," Asia and South Pacific Design Automation Conference, 2014, pp. 143-148, IEEE, 6 pages.

Yu et al., "Layout Decomposition for Quadruple Patterning Lithography and Beyond," Design Automation Conference, Jun. 2014, ACM, 6 pages.

Ban et al., "Flexible 2D Layout Decomposition Framework for Spacer-type Double Patterning Lithography," Design Automation Conference, Jun. 2011, ACM, 6 pages.

Yuan et al., "Double Patterning Layout Decomposition for Simultaneous Conflict and Stitch Minimization," IEEE Transactions on Computer-Aided Design of Integrated Circuits and Systems, Feb. 2010, pp. 185-196, vol. 29, No. 2, IEEE, 12 pages.

Yang et al., "A New Graph-Theoretic, Multi-Objective Layout Decomposition Framework for Double Patterning Lithography," Asia and South Pacific Design Automation Conference, 2010, pp. 637-644, IEEE, 8 pages.

Appel et al., "Every Planar Map is Four Colorable," Bulletin of the American Mathematical Society, Sep. 1976, vol. 82, Issue No. 5, pp. 711-712,2 pages.

Garey et al., "Some Simplified NP-Complete Graph Problems," Theoretical Computer Science, 1976, pp. 237-267, North-Holland Publishing Company, 31 pages.

Liebmann, "Layout Impact of Resolution Enhancement Techniques: Impediment or Opportunity?" International Symposium on Physical Design, Apr. 2003, pp. 110-117, ACM, 8 pages.

Grunbaum, "Grotzsch's Theorem on 3-Colorings," 1962, pp. 303-310, 8 pages.

Thomassen, "Grotzsch's 3-Color Theorem and Its Counterparts for the Tows and the Projective Plane," Journal of Combinatorial Theory, 1994, pp. 268-279, Series B 62, Academic Press Inc., 12 pages.

Tian et al., "A Polynomial Time Triple Patterning Algorithm for Cell Based Row-Structure Layout in Computer-Aided Design," International Conference on Computer-Aided Design, Nov. 2012, pp. 57-64, ACM, 8 pages.

Yu et al., "Layout Decomposition for Triple Patterning Lithography," International Conference on Computer-Aided Design of Integrated Circuits and Systems, 2011, IEEE, 8 pages.

Non-Final Office Action received for U.S. Appl. No. 15/466,525 dated May 15, 2018, 22 pages.

Non-Final Office Action received for U.S. Appl. No. 15/842,508 dated May 15, 2018, 21 pages.

Office Action dated Nov. 26, 2018 for U.S. Appl. No. 15/842,508, 18 pages.

Final Office Action received for U.S. Appl. No. 15/842,508 dated May 10, 2019, 10 pages.

\* cited by examiner

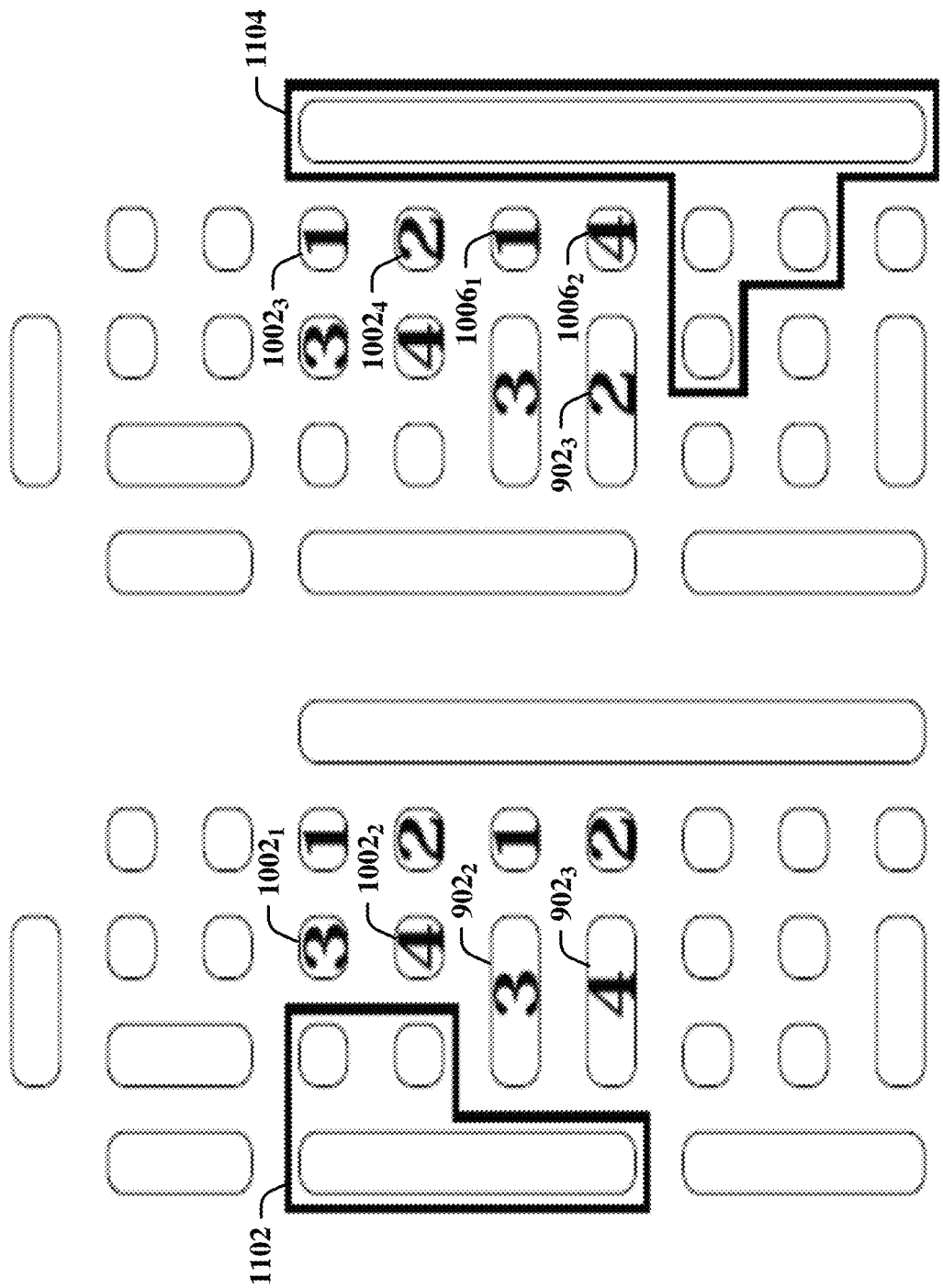

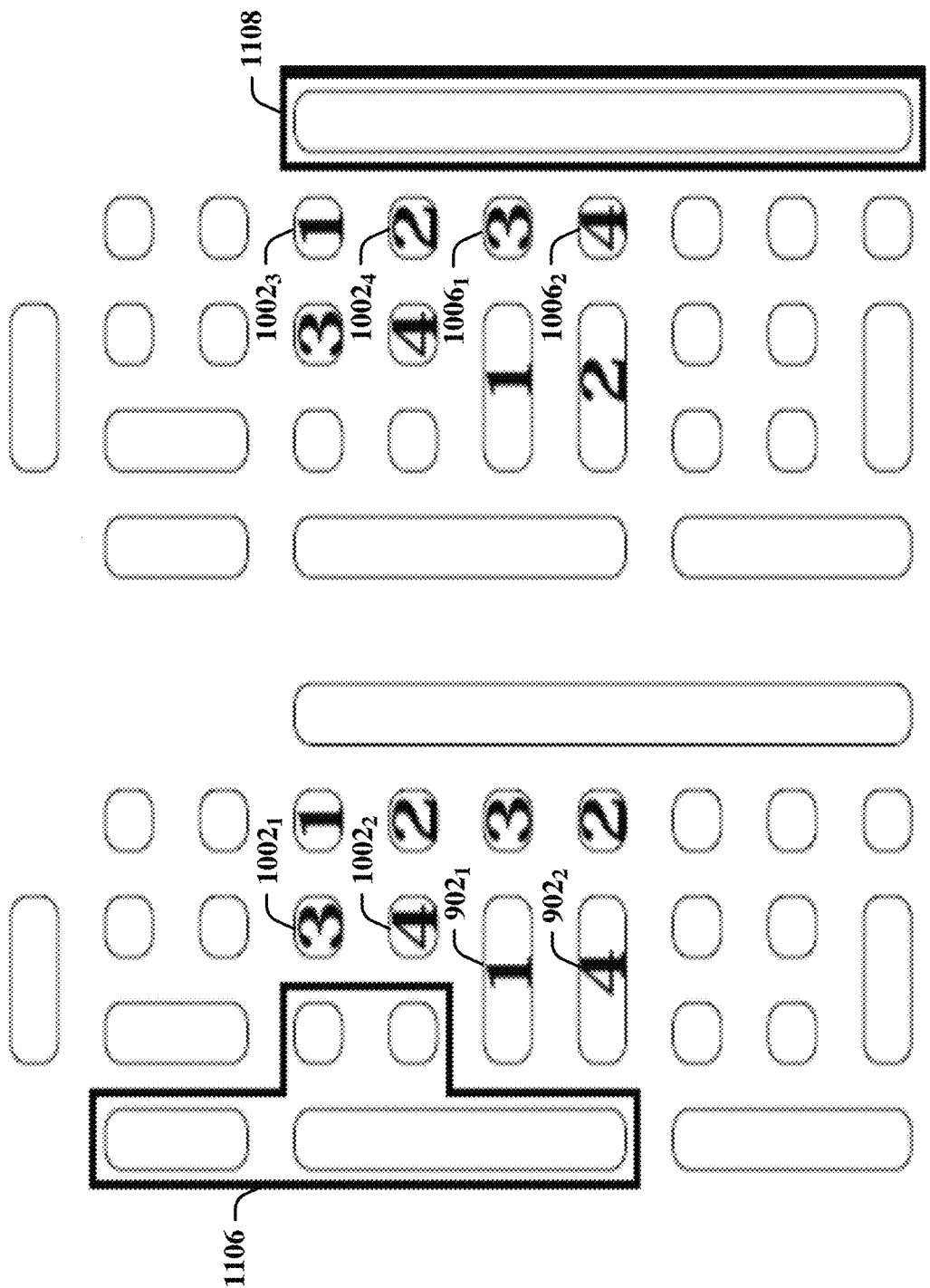

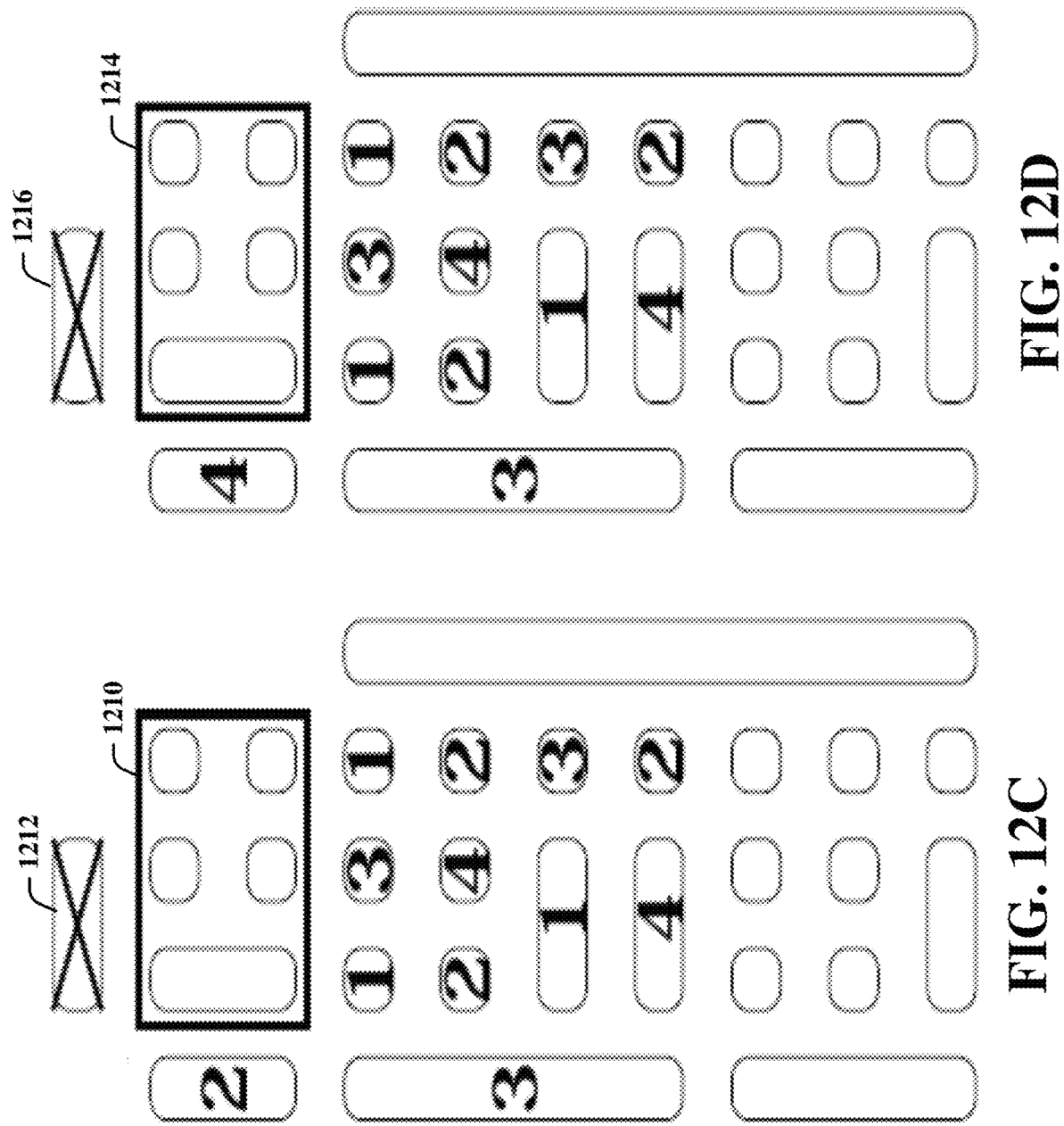

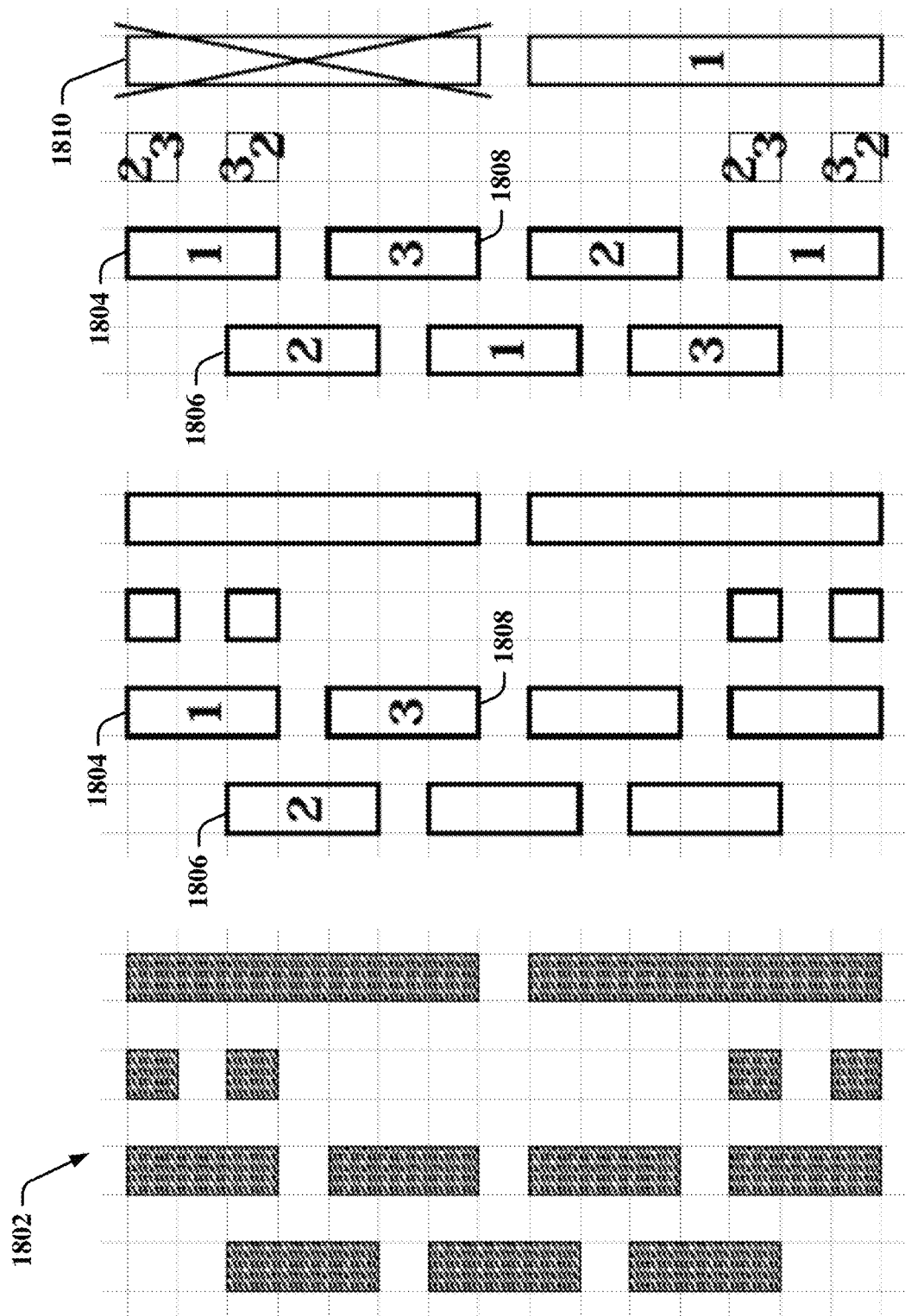

TRIPLE AND QUAD COLORING OF SHAPE LAYOUTS

BACKGROUND

The subject disclosure relates to lithography, and more specifically, to triple and quad coloring of layout models.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate triple and quad coloring of shape layouts are described.

According to an embodiment, a computer-implemented method can comprise determining, by a system operatively coupled to a processor, that a first defined shape within a shape layout satisfies a layout specification and a second defined shape within the shape layout satisfies a defined rule. The computer-implemented method can also comprise coloring, by the system, the shape layout with a plurality of colors in accordance with a defined design rule based on the determining. Coloring the shape layout can comprise identifying masks for the shape layout.

In accordance with another embodiment, a system can include a memory that stores computer executable components and a processor that executes the computer executable components stored in the memory. The computer executable components can comprise a first rules component that determines one or more first defined shapes in a shape layout satisfy a layout specification and a second rules component that determines one or more second defined shapes in the shape layout satisfy a defined rule. The computer executable components can also comprise a first application component that applies coloring to the one or more first defined shapes according to a first defined design rule and a second application component that applies coloring to the one or more second defined shapes according to a second defined design rule.

In accordance with another embodiment is a computer program product for facilitating coloring of shape layouts, the computer program product comprising a computer readable storage medium having program instructions embodied therewith. The program instructions are executable by a processor to cause the processor to determine, by the processor, that a first defined shape within a shape layout satisfies a layout specification and a second defined shape within the shape layout satisfies a defined rule. The program instructions can also cause the processor to color, by the processor, the shape layout with a plurality of colors in accordance with a defined design rule based on the determination.

DESCRIPTION OF THE DRAWINGS

FIGS. 11A, 11B, 11C and 11D illustrate example, non-limiting embodiments of coloring a defined region of FIG. 10B in accordance with one or more embodiments described herein.

FIGS. 12C and 12D illustrate example, non-limiting alternative paths for the situation of FIG. 11C in accordance with one or more embodiments described herein.

FIGS. 18A, 18B, and 18C illustrate example, non-limiting representations of a Model F that is not capable of being colored with three colors in accordance with one or more embodiments described herein.

DETAILED DESCRIPTION

Figure 1:
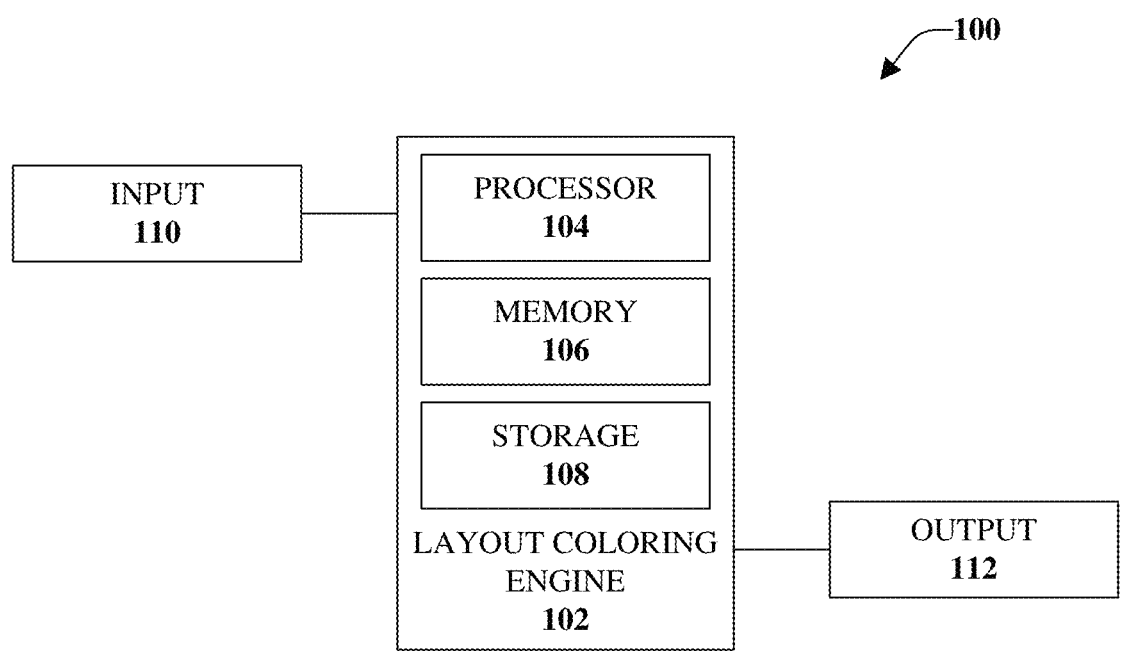
FIG. 1 illustrates a block diagram of an example, non-limiting system that facilitates determination of shape layout and resulting coloring of the shape layout in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The continued delay of higher resolution alternatives for lithography is forcing the adoption of multi-patterning solutions in new technology nodes, which include triple and quadruple patterning using multiple lithography-etch steps. In the design space, one or more patterns of a multi-patterning solution can be modeled as a color on a shape. Designers or Electronic Design Automation (EDA) tools determine the colors that shapes are assigned, which results in a shapes layout coloring problem. The shapes layout coloring problem itself is formulated as a k-coloring problem in a graph. For example, k-coloring a graph involves an assignment of one color out of k possible colors to one or more vertex of the graph (e.g., vertex coloring) such that no two adjacent vertices receive the same color. Thus, the k-coloring problem relate to how to assign the colors such that no two adjacent vertices receive the same color. Further, as shape layout designs continue to push area densities, coloring interactions cross cell boundaries, driving flat coloring, and further complicating the cell placement problem.

K-coloring a graph is an NP-complete problem (e.g., a class of decision problems when color k is equal to or greater than three (e.g., three colors, four colors). However, not all graphs are difficult to color, and the complexity of coloring graphs resulting from layouts is unknown. In this detailed disclosure the complexity of coloring graphs resulting from layouts for color k={3, 4} is addressed. Models for the layouts and the resulting constraint graphs are provided herein. It is also demonstrated that for some layout models, layouts can be colored always with a P-time algorithm. These colorable models enable cell placement and a simple coloring strategy. The colorable models are then altered, and layouts shown where no coloring exists, thereby hinting at the complexity of the more general layout coloring problems.

The subject disclosure is directed to computer processing systems, computer-implemented methods, apparatus and/or computer program products that facilitate efficiently, effectively, and automatically (e.g., without direct human involvement) triple and quad coloring of shapes layouts.

The computer processing systems, computer-implemented methods, apparatus and/or computer program products employ hardware and/or software to solve problems that are highly technical in nature (e.g., related to determination of whether a layout conforms to a set of rules and applying coloring based on the determination), that are not abstract and that cannot be performed as a set of mental acts by a human. For example, a human, or even thousands of humans, cannot efficiently, accurately and effectively manually analyze the voluminous amounts of layouts that are available and the corresponding coloring problem. One or more embodiments of the subject computer processing systems, methods, apparatuses and/or computer program products can enable the automated detection of layout design and coloring in a highly accurate and efficient manner.

FIG. 1 illustrates a block diagram of an example, non-limiting system 100 that facilitates determination of shape layout and resulting coloring of the shape layout in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

As illustrated, non-limiting system 100 can comprise a layout coloring engine 102, a processor 104, a memory 106 and/or a storage 108. In some embodiments, one or more of the layout coloring engine 102, the processor 104, the memory 106 and/or the storage 108 can be communicatively and/or electrically coupled to one another to perform one or more functions of the system 100.

According to one or more embodiments, the layout coloring engine 102 can receive as input 110 information related to one or more shape layouts. The information can be received from another component, or directly from the shape layout. For example, the layout coloring engine 102 can scan the shape layout or use another manner of detecting the shape layout. Based on the received or detected input 110 information related to the shape layout, the layout coloring engine 102 can determine whether the shape layout can be colored using three or four colors. An output 112 of the layout coloring engine 102 can be the design for three or four colors to be applied to the shape layout.

In an example related to four colors, the layout coloring engine 102 can determine whether first defined shapes (e.g., vertical rectangles) within the shape layout satisfy a layout specification and that one or more second defined shapes (e.g., Z-shapes) of the shape layout conform to a defined rule. If not, the layout coloring engine 102 can determine the shape layout cannot be colored. If the vertical rectangles satisfy the layout specification and the Z-shapes conform to the defined rule, the layout coloring engine 102 can color the shape layout with four colors in accordance with a defined design rule.

For example, the layout coloring engine 102 can determine vertical rectangles within the shape layout satisfy the layout specification based on the vertical rectangles within the shape layout comprising a first width one aligned to a square grid and separated by a space of a second width of at least one. In another example, the layout coloring engine 102 can determine Z-shapes within the shape layout conform to the defined rule based on the Z-shapes of the shape layout occupying five squares and being adjacent to no more than four vertical rectangles. Further to this determination, the layout coloring engine 102 can determine the Z-shapes and vertical rectangles are aligned to the square grid and are at $l_\infty$ distance greater than or equal to one from other shapes.

In further detail, the various aspects discussed herein relate to technologies with multiple lithography-etch steps, which are denoted as k-LE multi patterning. The number k denotes the number of lithography-etch (LE) steps, and the number of masks for a layer.

From a shapes layout perspective, k-LE multi-patterning provides that the shapes in a layer be sub-divided into k masks, such that the following applies. Two shapes i and j on the same mask can be spaced by a minimum distance $D_{i,j}$, $D_{i,j} \geq S_S$, or same-mask spacing. Next, the minimum distance between two shapes on different masks satisfies $D_{i,j} \geq S_D$, or diff-mask spacing. Further the following equation $S_S > S_D$ should be satisfied.

To represent the masks in a shapes layout, the concept of a color can be introduced. By coloring a shape, the mask of that shape is identified. In addition, the formulation of the shape coloring problem is as follows: for a layout L, construct an undirected graph G(V,E), with a vertex $v_i \in G$ for one or more unique shapes $L_i \in L$ there exists an edge $e_{i,j} \in G$ when two shapes $L_i$ and $L_j$ occur at a minimum distance $D_{i,j} < S_s$.

The shape layout coloring problem of L is the same as the k coloring problem of graph G(V,E). When the number of colors k is two, P-time algorithms can be utilized to solve this problem. However, when the number of colors k is equal to or greater than three, this problem can be NP-complete. A P-time or a Polynomial-time algorithm, refers to an algorithm that has a problem of size b, and the time spent, or the number of steps to find the solution is a polynomial function of b.

Considerations related to implications to design flows, and more specifically to placement, resulting from the wholesale adoption of flat decomposition multi-patterning, can be applied with the one or more embodiments described herein. The complexity of the shapes layout coloring problem and whether color conflicts are likely can be understood with the various embodiments. Further, the one or more embodiments provide a practical strategy for the design of colored shapes, which does not impose density penalties and does not result in coloring conflicts after cell placement. In other words, provided are layout and placement strategies which eliminate the possibility of decomposition failures.

As used herein a "model" is the set of all layouts that follow a specified set of rules together with a definition of adjacency of a pair of shapes of a layout. Further, a model is called "n-colorable" if any layout that belongs to this model is colorable with the n different colors or less than the n different colors (n) so that no two adjacent shapes have the same color and are not n-colorable otherwise.

Figure 2:
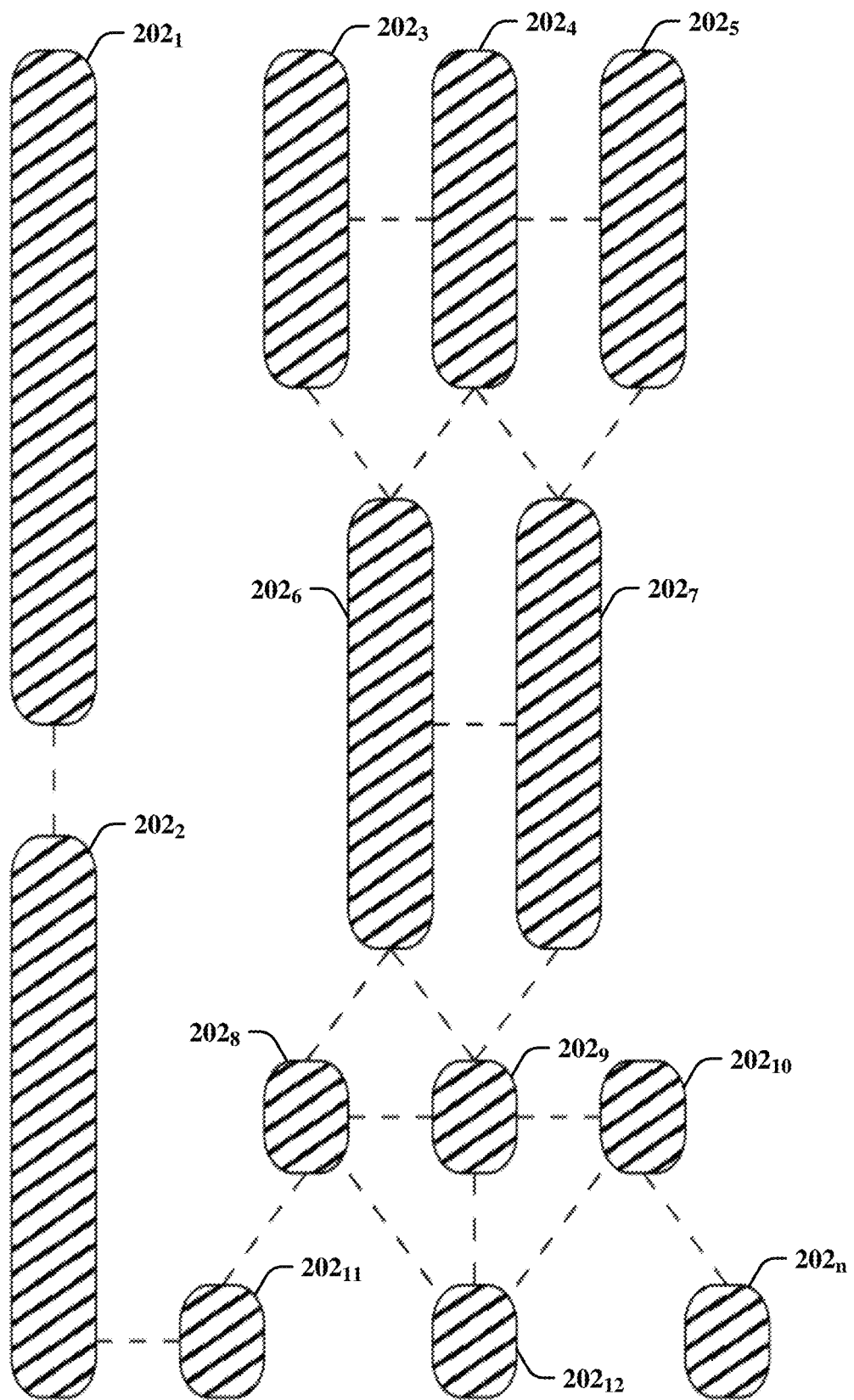
FIG. 2 illustrates an example, non-limiting representation of a Model A in accordance with one or more embodiments described herein.

The following illustrates proof of four colorability of a simple model in accordance with one or more embodiments described herein. With reference now to FIG. 2, illustrated is an example-non-limiting representation of a Model A in accordance with one or more embodiments described herein.

The model can include a plurality of shapes $202_1$-$202_n$, which can be vertical rectangles of width one aligned to a square grid and separated by space width of at least one. Two shapes can be adjacent if $l_\infty$ distance between the two shapes is equal to one. An example of Model A layer and its adjacency graph is shown in FIG. 2. The dashed lines between the shapes indicate adjacency. For example, shape $202_1$ is adjacent shape $202_2$. In another example, shape $202_6$ is adjacent shapes $202_3$, $202_4$, $202_7$, $202_8$, and $202_9$.

Figure 3:
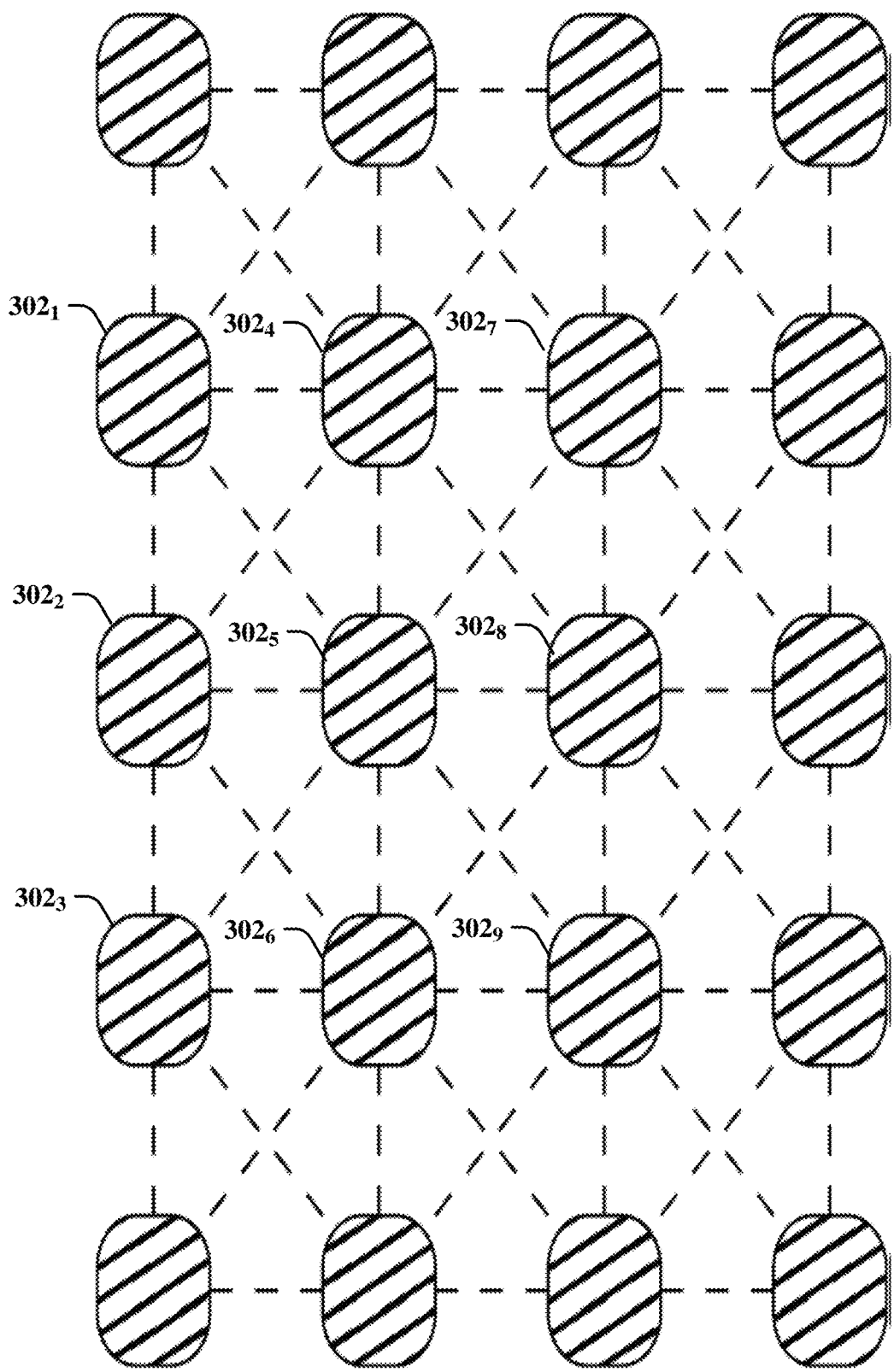
FIG. 3 illustrates a non-planar example for Model A in accordance with one or more embodiments described herein.

It is noted that vertexes of Model A graph of FIG. 2 can have up to 8 edges. This makes it simpler to construct a layer with a non-planar graph, as illustrated in FIG. 3, which illustrates a non-planar example for Model A in accordance with one or more embodiments described herein. The graph includes a set of vertices and a set of edges. As illustrated in FIG. 3, vertices are represented by the rectangles and the edges are represented by the lines extending from one vertex to a second vertex (e.g., the lines between the rectangles). For example, a few vertices are labeled as vertex $302_1$ through $302_9$. Vertex $302_2$ has five edges, represented by the lines between vertex $302_2$ and vertices $302_1$, $302_3$, $302_4$, $302_5$, and $302_6$. Further, vertex $302_5$ has eight edges, represented by the lines between vertex $302_5$ and vertices $302_1$, $302_2$, $302_3$, $302_4$, $302_6$, $302_7$, $302_8$, and $302_9$.

In the case of FIG. 3, a condition for planarity based on Euler formula (#EDGES $3^* \leq$ #VERTEXES$-6$), which states that the number of edges should less than or equal to three multiplied by the number of vertexes minus six. The condition for planarity of FIG. 3 is not satisfied for this graph. For example, the number of edges in FIG. 3 is 55 (e.g., counting all the lines between vertexes) and the number of vertexes is 20 and, using the equation: 3*20−6=54. Since 55 is not less than or equal to 54, the condition for planarity is not satisfied. This rules out the possibility to refer to a Four Color Map theorem to show four colorability of Model A or of any of the other (less restricted) models considered. However, it can still be proven that Model A is four colorable and provide a coloring algorithm that runs in O(n log n) time. The blow will explain that Model A is four colorable.

Figure 4:
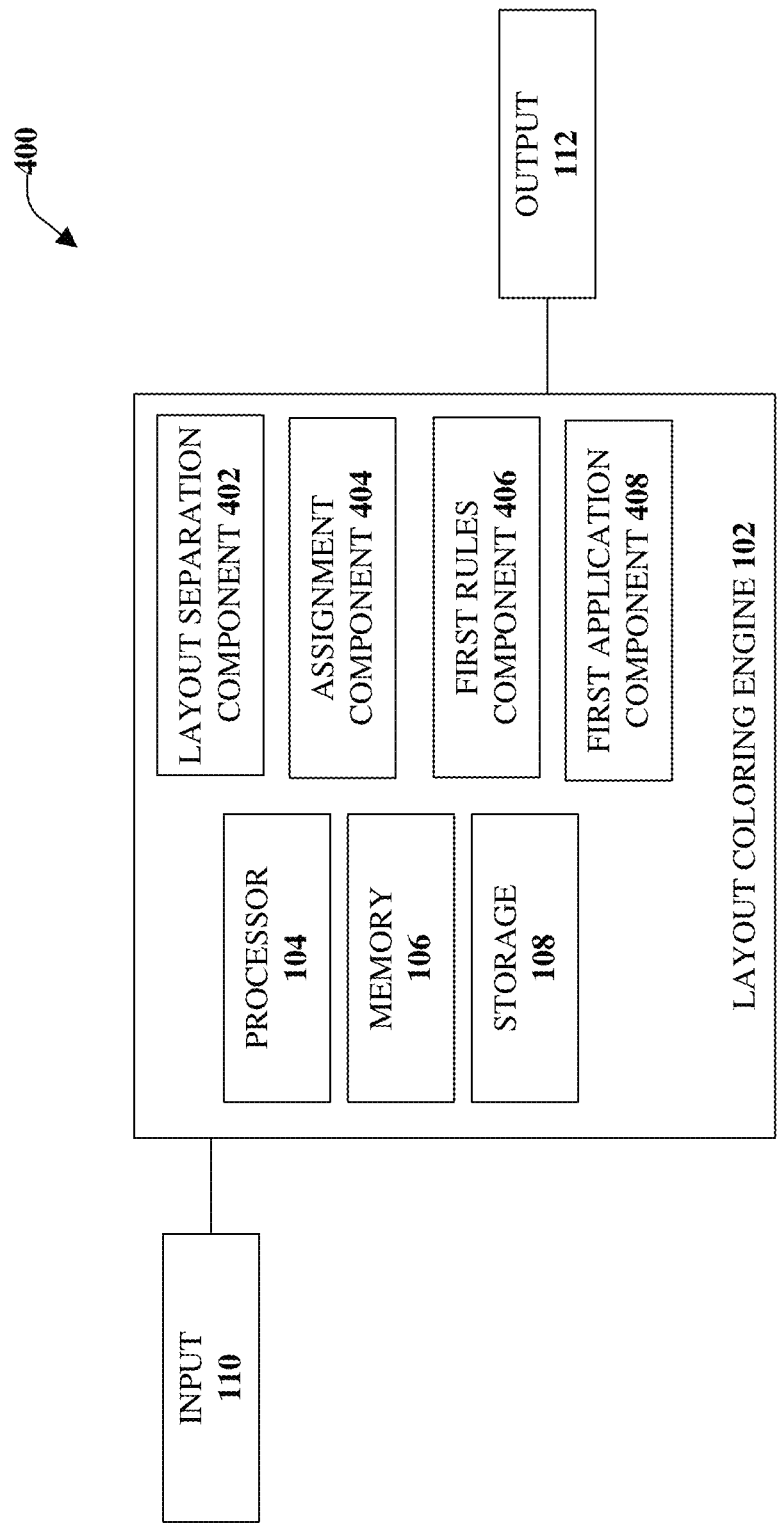
FIG. 4 illustrates a block diagram of an example, non-limiting system that facilitates triple and quad coloring of a shape layout in accordance with one or more embodiments described herein.

With reference also to FIG. 4 illustrates a block diagram of an example, non-limiting system 400 that facilitates triple and quad coloring of a shape layout in accordance with one or more embodiments described herein. Repetitive description of like elements employed in other embodiments described herein is omitted for sake of brevity. Non-limiting system 400 can comprise one or more of the components and/or functionality of system 100, and vice versa.

As illustrated in FIG. 4, the system 400 can include a layout separation component 402, an assignment component 404, a first rules component 406, and a first application component 408. The layout separation component 402 can split the shape layout into columns that have a width of two and label the odd columns and the even columns differently. For example, the layout separation component 402 can begin with a first column, such as the first column on the left-side of a shape layout (or the right-side according to some implementations). The first two columns (e.g., columns 1 and 2) are an odd column-pair, the next two columns (e.g., columns 3 and 4) are an even column-pair, the next two columns (e.g., columns 5 and 6) are an odd column-pair, the next two columns (e.g., columns 7 and 8) are an even column-pair, and so on for subsequent columns until the last column-pair (or the last single column) is reached.

The assignment component 404 can label one or more column-pairs and indicate color-pairs designated for the one or more column-pairs. Color-pairs can contain two colors and there can be two color-pairs (e.g., four different colors). For example, a first color-pair can be designated with a first color and a second color, and a second color-pair can be designated with a third color and a fourth color. Continuing the above example, the assignment component 404 can designate the first color-pair to the odd column-pairs and the second color-pair to the even column-pairs. Alternatively, the assignment component 404 can designate the first color-pair to the even column-pairs and the second color-pair to the odd column-pairs.

The first rules component 406 can verify whether the shape layout conforms to one or more rules related to the application of three or four colors (or layers) as discussed herein. For Model A, a rule can be that the vertical rectangles should be a width of one. If a vertical rectangle has a width of two or more, the first rules component 406 can determine that the shape layout does not conform to the rules (e.g., a layout specification) and cannot be colored according to the various aspects discussed herein. According to some implementations, the first rules component 406 can make the determination prior to the layout separation component 402 splitting the shape layout into the column-pairs and the assignment component 404 labeling the one or more column-pairs and designating color-pairs for the one or more column-pairs.

Based on the first rules component 406 determining the shape layout satisfies the one or more rules (e.g., the layout specification), the first application component 508 can color the shapes in the one or more columns, from top to bottom using the two colors from the column labels in alternating order. This will be explained in further detail with respect to FIGS. 5A and 5B, which are representations of coloring for Model A in accordance with one or more embodiments described herein.

Figure 5A:
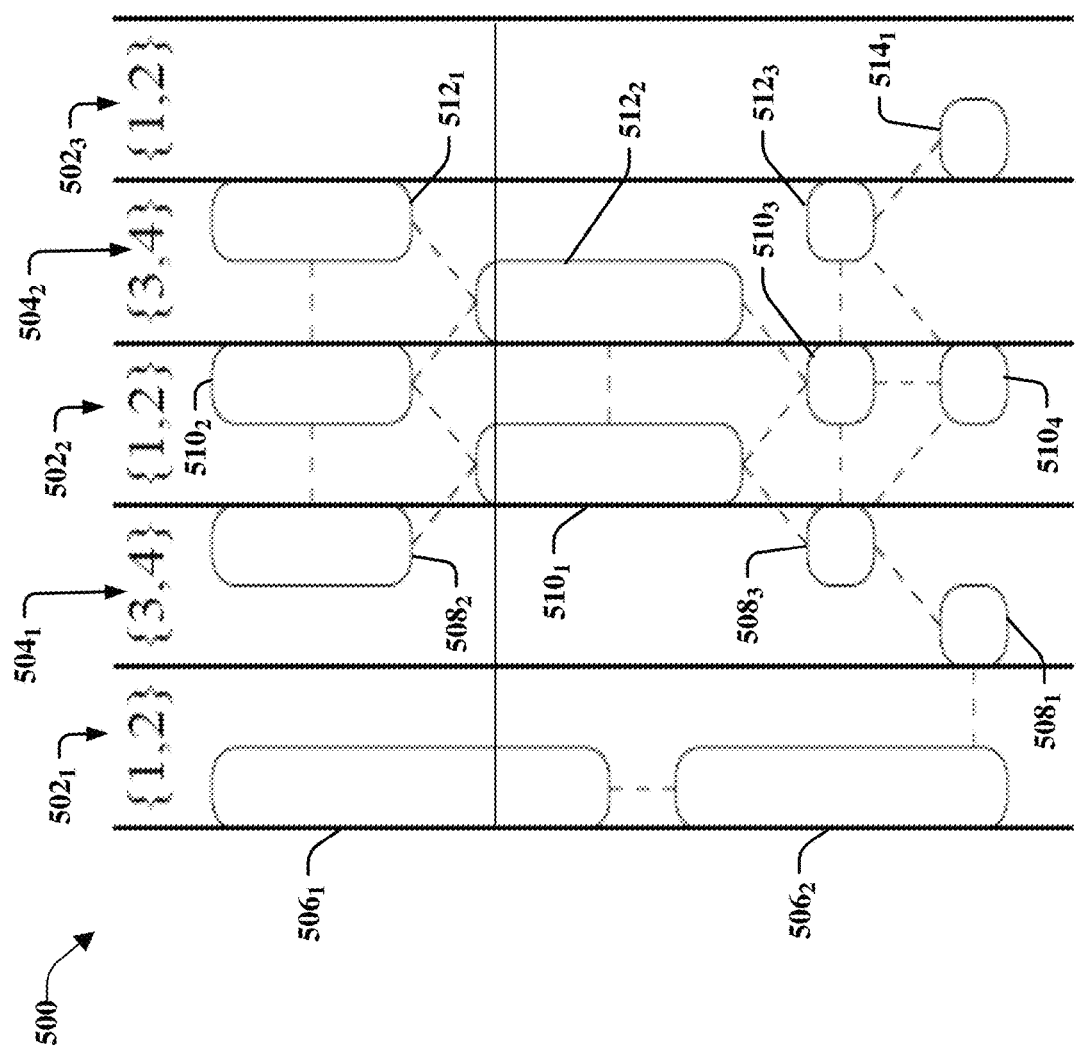
FIGS. 5A and 5B illustrate example, non-limiting representations of coloring for Model A in accordance with one or more embodiments described herein.
Figure 5B:
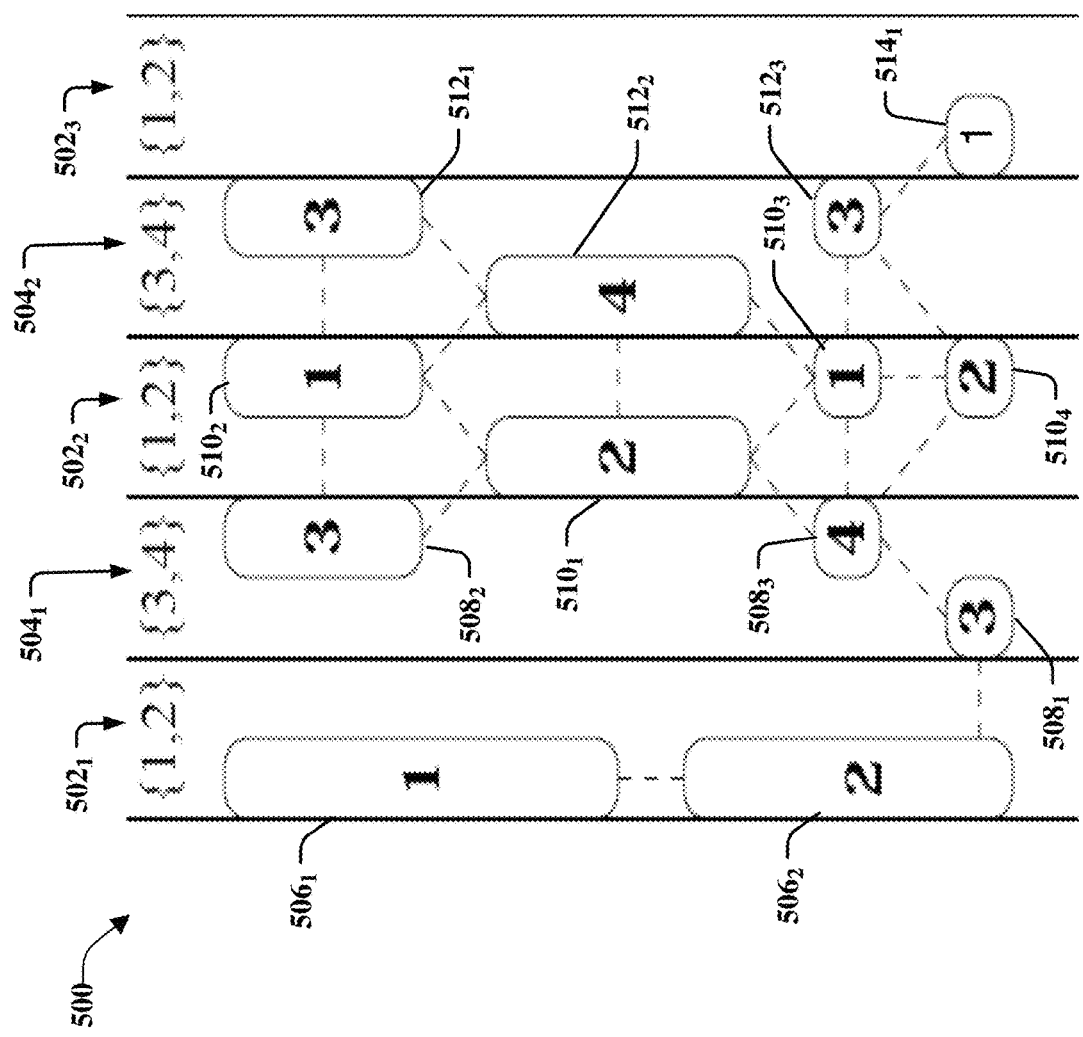

For example, as depicted in FIG. 5A, a shape layout 500 comprises a width of ten and can be divided or split, by the layout separation component 402 into five two-width columns. Starting with the first column, the layout separation component 402 can assign the odd columns $502_1$, $502_2$, and $502_3$ a first label-pair and the even columns $504_1$ and $504_2$ with a second label-pair. For purposes of discussion, the odd columns can be assigned label-pair {1, 2} and the even columns can be assigned label-pair {3, 4}.

In the example of FIG. 5A, all vertical rectangles comprise a width of one. The first odd column $502_1$ comprises two vertical rectangles $506_1$, $506_2$ that have a length of five. The first even column $504_1$ comprises three vertical rectangles $508_1$, $508_2$, and $508_3$. Vertical rectangle $508_1$ has a length of one, vertical rectangle $508_2$ has a length of three, and vertical rectangle $508_3$ has a length of one. The second odd $502_2$ column comprises four vertical rectangles $510_1$, $510_2$, $510_3$, and $510_3$. Vertical rectangle $510_1$ has a length of four; vertical rectangle $510_2$ has a length of three, and vertical rectangles $510_3$ and $510_4$ both have a length of one. Further, the second even column $504_2$ comprises three vertical rectangles $512_1$, $512_2$, and $512_3$. Vertical rectangle $512_1$ has a length of four, vertical rectangle $512_2$ has a length of three, and vertical rectangle $512_3$ has a length of one. Lastly, the third odd column $502_3$ comprises one vertical rectangle $514_1$ that has a length of one.

Since all the vertical rectangles in FIG. 5A have a width of one, the layout specification for this example is satisfied as determined by the first rules component 406. Thus, the first application component 508 can proceed to color the columns as follows. The first odd column-pair $502_1$ is labeled with color-pair {1, 2} and, therefore, vertical rectangle $506_1$ is colored with color 1 and vertical rectangle $506_2$ is colored with color 2. The first even column-pair $504_1$ is labeled with {3, 4}. Thus, starting from the top, vertical rectangle $508_2$ is colored with color 3, vertical rectangle $508_3$ is colored with color 4, and vertical rectangle $508_1$ is colored with color 3 (since there are only two colors in a color-pair). The second odd column-pair $502_2$ is labeled with color-pair {1, 2} and, therefore, vertical rectangle $510_2$ is colored with color 1, vertical rectangle $510_1$ is colored with color 2, vertical rectangle $510_3$ is colored with color 1, and vertical rectangle $510_4$ is colored with color 2. The second even column-pair $504_2$ is labeled with color-pair {3, 4}, and thus, vertical rectangle $512_1$ is colored with color 3, vertical rectangle $512_1$ is colored with color 4, and vertical rectangle $512_3$ is colored with color 3. Further, the vertical rectangle $514_1$ of the third odd column-pair $502_3$ is colored with color 1.

During runtime, the only operations used by the system 400 can be ordering of the set of shapes by x coordinates and ordering of its disjoint subsets by y coordinate. Therefore, O(n log n) runtime upperbound. The following will describe the proof of correctness. Let S be a shape from the layer which belongs to column number N. All shapes from columns with numbers<=N−2 and >=N+2 can be at least 2 squares apart from S so they contain no shapes adjacent to S. All shapes from columns N−1 and N+1 can be colored differently than S (e.g., label odd columns with {1, 2} and even columns with {3, 4}. There can be at most two shapes adjacent to S in column N itself: one from the top and one from the bottom of S. Since the shapes in the one or more columns can be colored from top to bottom using the two colors from the columns label in alternative order, the shapes are both of the same color and this color is different from the color of S.

Figure 6A:
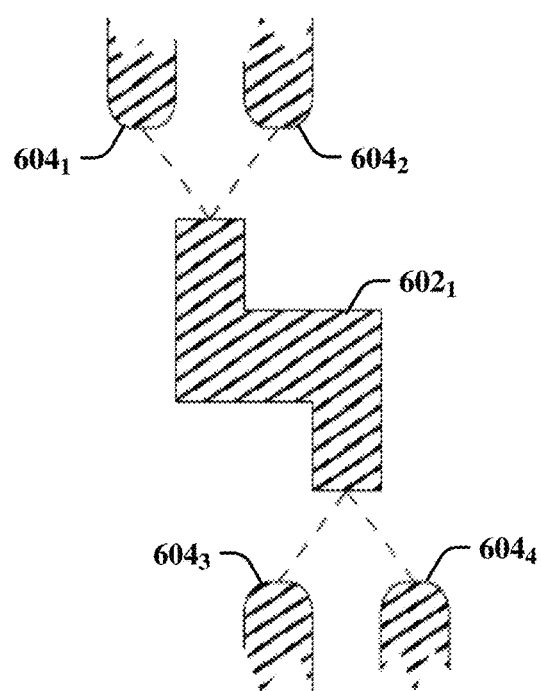
FIGS. 6A and 6B illustrate a definition for a Z-shape for a Model B in accordance with one or more embodiments described herein.
Figure 6B:
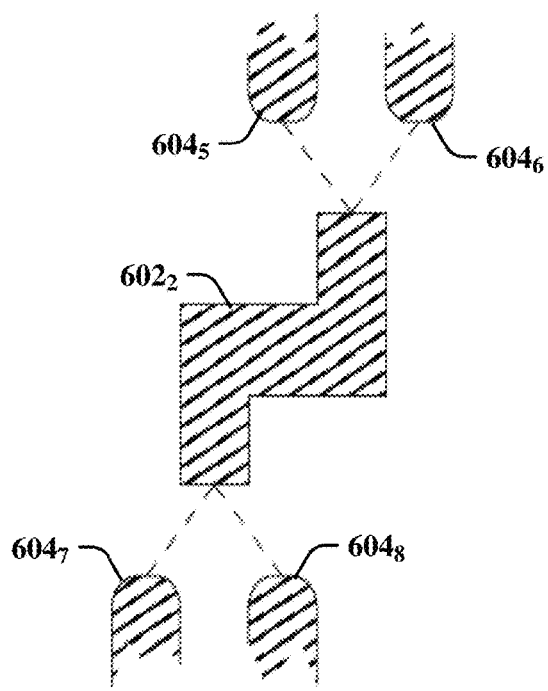

The following figures illustrate a more sophisticated model, which can contain an additional type of shape in accordance with one or more embodiments described herein. This more sophisticated model is referred to as Model B. In this case, shapes of two types can be allowed, namely, vertical rectangles and Z-shapes. The vertical rectangles can be of width one as discussed with respect to Model A. A Z-shape occupies five squares as illustrated in FIGS. 6A and 6B. A Z-shape can be adjacent only to four or less vertical rectangles which are located with respect to that Z-shape exactly. As illustrated in FIG. 6A, a Z-shape $602_1$ is adjacent to four vertical rectangles $604_1$, $604_2$, $604_3$, and $604_4$. As illustrated in FIG. 6B, a Z-shape $602_2$ is adjacent to four vertical rectangles $604_5$, $604_6$, $604_7$, and $604_8$. Z-shapes that satisfy this rule can be in conformance with a defined rule as discussed herein.

In a similar manner as described for Model A, all shapes can be aligned to a square grid and can be at $1_\infty$ distance greater than or equal to one from other shapes. As before, two shapes can be adjacent if $1_\infty$ distance between the shapes is one. The following will describe that Model B is four colorable.

Figure 7:
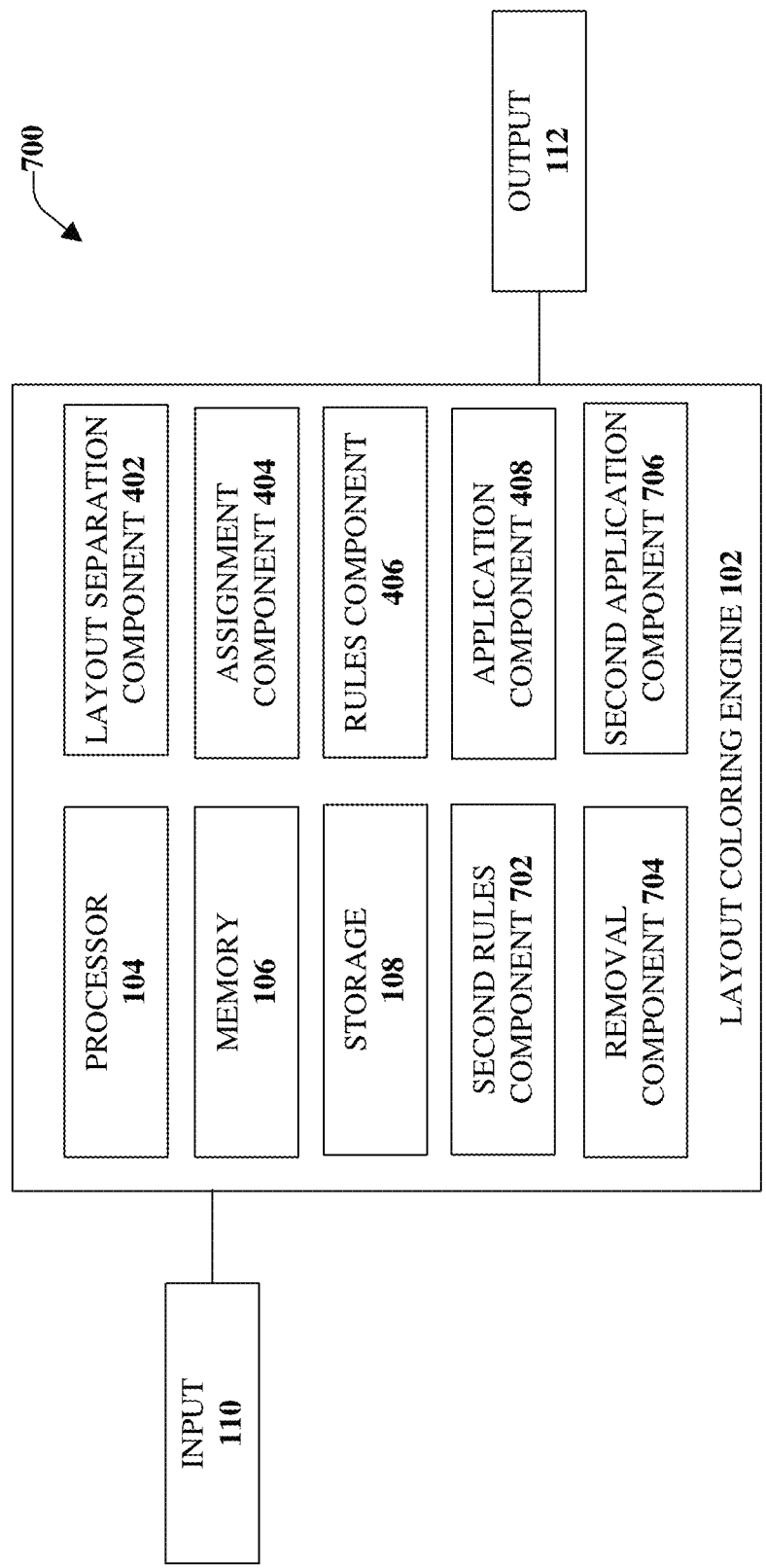
FIG. 7 illustrates a block diagram of an example, non-limiting system that facilitates triple and quad coloring of a shape layout that comprises multiple shapes in accordance with one or more embodiments described herein.

FIG. 7 illustrates a block diagram of an example, non-limiting system 700 that facilitates triple and quad coloring of a shape layout that comprises multiple shapes in accordance with one or more embodiments described herein. Repetitive description of like elements employed in other embodiments described herein is omitted for sake of brevity. Non-limiting system 700 can comprise one or more of the components and/or functionality of the system 100 and/or the system 400, and vice versa.

The layout separation component 402 can split a shape layout into multiple column-pairs that comprise two-columns, the columns having a width of one. The assignment component 404 can assign odd column-pairs a first label and even column-pairs a second label. Further, the assignment component 404 can designate a first color-pair to the odd column-pairs and a second color-pair to the even column-pairs. The first color-pair can comprise a first color and a second color; the second color-pair can comprise a third color and a fourth color. The first color, the second color, the third color, and the fourth color can be different colors.

Further, the first rules component 406 can determine if first defined shapes within the shape layout conform to one or more rules related to the coloring of the shape layout (e.g., a layout specification). According to an implementation, the first defined shape can be a vertical rectangle shape and the layout specification can be that vertical rectangles in the shape layout should have a width of one. A second rules component 702 can determine if a second defined shape within the shape layout conforms to one or more defined rules related to the coloring of the shape layout. In an implementation, the second defined shape can be a Z-shape. Further to this implementation, the second rules component 702 can determine if the Z-shapes within the shape layout conform to a defined rule based on the Z-shapes of the shape layout occupying five squares and being adjacent to no more than four vertical rectangles. Further to this determination, the second rules component 702 can determine the Z-shapes and vertical rectangles can be aligned to the square grid and can be at $l_\infty$ distance equal to or greater than one from other shapes in the shape layout.

The first application component 408 can color the first defined shapes and parts of the second defined shapes in the one or more columns using the color-pair defined for the one or more column-pairs. For example, the first defined shapes and the parts of the second defined shapes in the one or more columns can be colored from top to bottom using the two colors in alternating order. In this manner, for the odd column-pairs, the first application component 408 can facilitate use of the first color for a first encountered shape (e.g., a first defined shape, part of a second defined shape), the second color for a second encountered shape, the first color for a third encountered shape, the second color for a fourth encountered shape, and so on. The first application component 408 can alternate between the first color and the second color until all shapes in the respective odd column-pair can be colored. For the even column-pairs, the first application component 408 can facilitate use of a third color for a first encountered shape, a fourth color for a second encountered shape, the third color for a third encountered shape, the fourth color for a fourth encountered shape, and so on. The first application component 408 can alternate between the third color and the fourth color until all shapes in the respective even column-pair can be colored.

A removal component 704 can remove the colors from the parts of the second defined shapes such that the second defined shapes are no longer colored. The removal of color can occur after the entire shape layout is colored or during application of the color on subsequent column-pairs. For example, the first odd column-pair and the first even column-pair can be colored and then the color is removed from any of the second shapes that span between the first odd column-pair and the first even column-pair. Next, the second odd column-pair can be colored and, thereafter, color can be removed from any of the second defined shaped that span between the first even column-pair and the second odd column-pair.

Upon or after the color is removed from the second defined shapes, a second application component 706 can color the second defined shapes with a color that does not create conflicts with the existing coloring of the first defined shapes. The color used by the second application component 706 can be a color from the first color-pair or the second-color pair, regardless of the color-pair assigned to any column-pair, as will described in further detail with respect to FIGS. 8A and 8B.

Figure 8A:
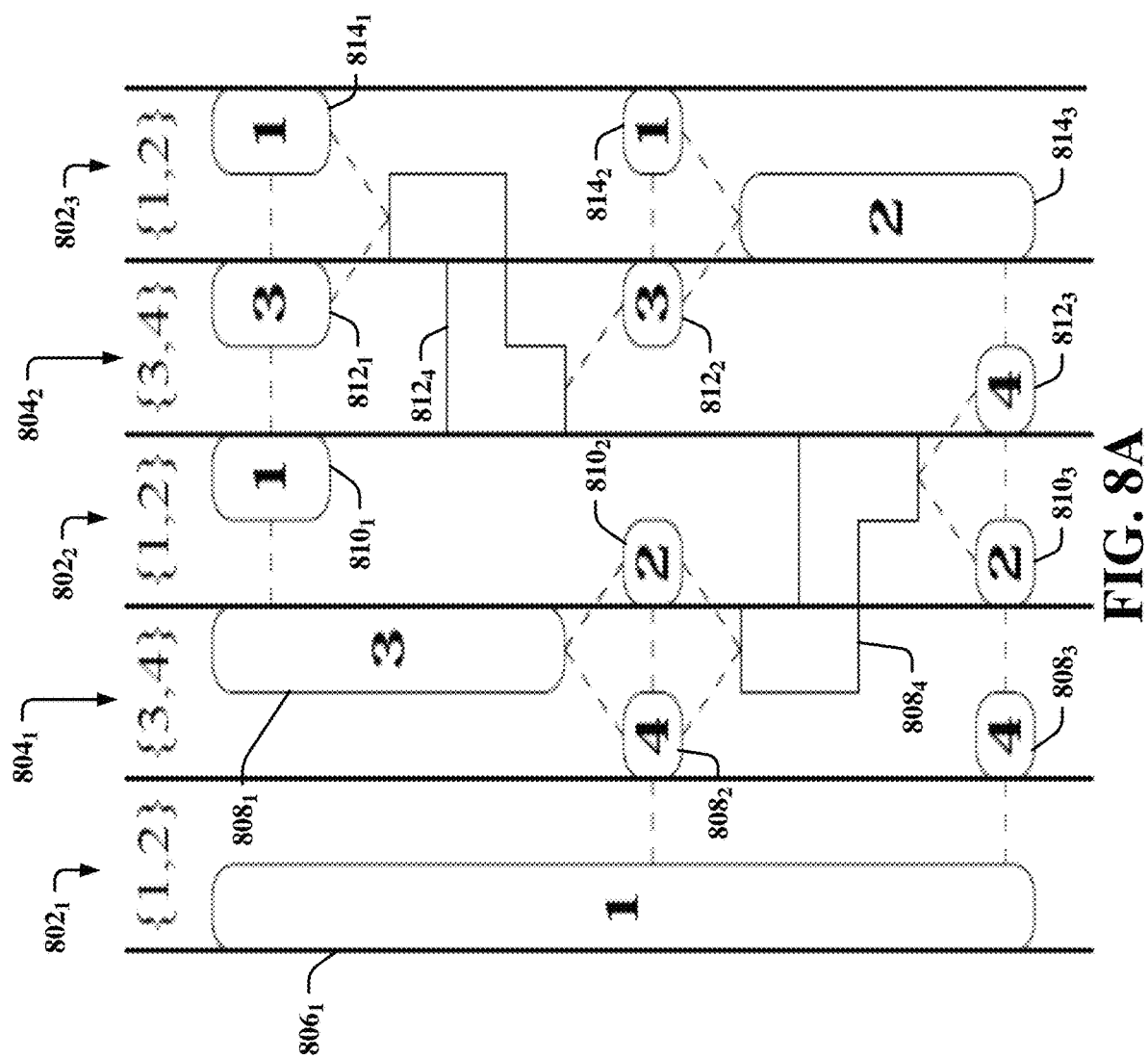
FIGS. 8A and 8B illustrate representations of coloring of Model B in accordance with one or more embodiments described herein.
Figure 8B:
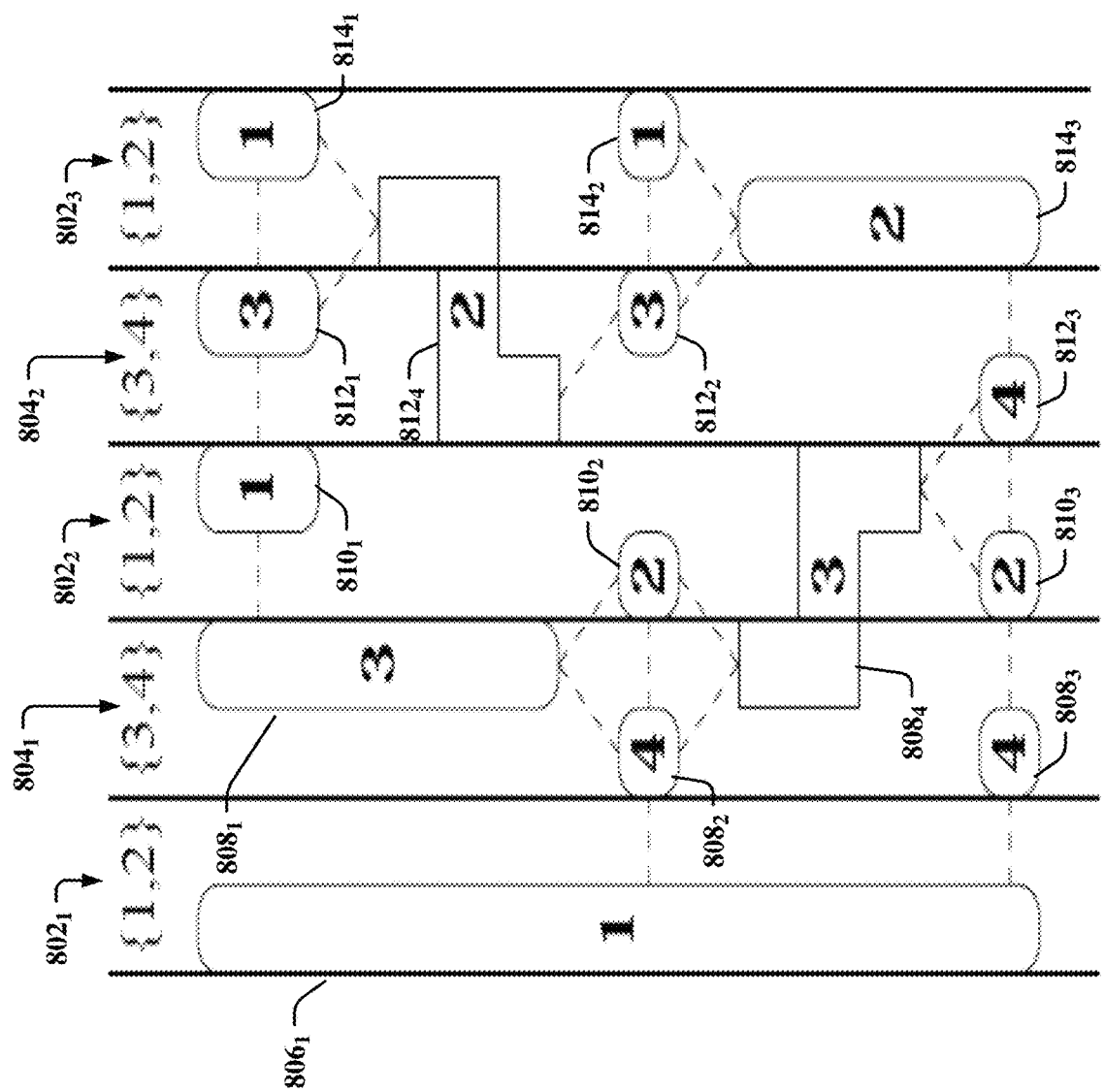

FIGS. 8A and 8B illustrate a representation of coloring for Model B in accordance with one or more embodiments described herein. There are two different shapes in FIG. 8A, a first shape and a second shape. According to an implementation, the first shape can be a vertical rectangle shape and the second shape can be a Z-shape. In the shape layout of FIG. 8A, all vertical rectangles comprise a width of one and all Z-shapes occupy five squares and are adjacent to no more than four vertical rectangles.

The shape layout is split into column-pairs and, in this example, there are three odd column-pairs $802_1$, $802_2$, $802_3$ and two even column-pairs $804_1$, $804_2$. The first odd column-pair $802_1$ comprises a vertical rectangle $806_1$ having a width of one and a length of eleven. The first even column-pair $804_1$ comprises three vertical rectangle shapes $808_1$, $808_2$, $808_3$, and a first portion of a Z-shape $808_4$. Vertical rectangle $808_1$ comprises a width of one and a length of five. Vertical rectangles $808_2$ and $808_3$ comprise width and length of one. The second odd column-pair $802_2$ comprises three vertical rectangles $810_1$, $810_2$, $810_3$, and a second portion of the Z-shape $808_4$. Further, the second even column-pair $804_2$ comprises three vertical rectangles $812_1$, $812_2$, $812_3$, and a first portion of a Z-shape $812_4$. The third odd column-pair $802_3$ comprises three vertical rectangles $814_1$, $814_2$, $814_3$, and a second portion of the Z-shape $812_4$.

As illustrated in FIG. 8A, rectangle shape $806_1$ can be colored a first color, based on the color-pair defined for the first odd column-pair $802_1$. For the first even column-pair $804_1$, rectangle shape $808_1$ can be colored the third color (defined by the color-pair), vertical rectangle $808_2$ can be colored the fourth color, the portion of the Z-shape $808_4$ can be colored the third color, and vertical rectangle $808_3$ can be colored the fourth color. For the second odd column-pair $802_2$, vertical rectangle $810_1$ can be colored the first color, vertical rectangle $810_2$ can be colored the second color, the other portion of the Z-shape $808_4$ can be colored the first color, and vertical rectangle $810_3$ can be colored the second color.

Continuing for the process, for the second even column-pair $804_2$, vertical rectangle $812_1$ can be colored the third color, the portion of the Z-shape $812_4$ can be colored the fourth color, vertical rectangle $812_2$ can be colored the third color, and vertical rectangle $812_3$ can be colored the fourth color. For the third odd column-pair $802_3$, vertical rectangle $814_1$ can be colored with the first color, the other portion of the Z-shape $812_4$ can be colored the second color, vertical rectangle $814_2$ can be colored the first color, and vertical rectangle $814_3$ can be colored the second color.

The colors of the portions of Z-shape $808_4$ and Z-shape $812_4$ can be removed, as illustrated in FIG. 8A, wherein the Z-shapes are not labeled with a color. As illustrated in FIG. 8B, based on the defined rules, Z-shape $808_4$ and Z-shape $812_4$ can be colored with a color that does not conflict with an existing color. For example, since Z-shape $808_4$ is surrounded by four vertical rectangles, namely, vertical rectangles $808_2$, $810_2$, $808_3$, and $810_3$, k colors 2 and 4 cannot be used for the Z-shape $808_4$ (note the adjacency lines). Therefore, a color can be chosen by the second application component 706 for the Z-shape $808_4$, such as color 3 as illustrated.

In a similar manner, Z-shape $812_4$ is surrounded by three vertical rectangles, namely, vertical rectangles $812_1$, $814_1$, and $812_2$ (note the adjacency lines). Therefore, the colors 1 and 3 cannot be used for the Z-shape $812_4$. Therefore, a different color can be chosen by the second application component 706 for the Z-shape $812_4$, such as color 2 as illustrated.

It is noted that during runtime, the most expensive operation for the system 700 of FIG. 7 can be the ordering of shapes by a coordinate. The runtime is O(n log n). For example, after the first defined shape and the parts of the second defined shapes can be colored in the one or more columns from top to bottom, the first defined shapes can be colored conflict free. Thus, removing the colors from the parts of the second defined shapes is possible. For example, by definition a second defined shape (e.g., Z-shape) can have at most four adjacent shapes all of which are vertical. When the shapes are colored in the one or more columns, two of the shapes that lie on the vertical center line of Z-shape (if both are present) can be colored in the same color. For example, vertical rectangle $808_2$ and vertical rectangle $808_3$ of FIG. 8 have a same color (e.g., color 4). Therefore, the adjacent shapes have used up three or less colors. Accordingly, the remaining color can be used for the Z-shape.

As discussed with respect to the above FIGS., a four colorable model is available according to the one or more embodiments provided herein. The following provides examples to illustrate the extent to how much the design rules can be relaxed without breaking the four colorability property. The following will describe that both models A and B are in close conformance with design rules for the four colorability property. For example, allowing only a few 3×1 horizontal rectangles in Model A breaks the four colorability and so does allowing Z-shapes to be aligned differently than those shown and described with respect to the up to four neighbors of the Z-shapes in Model B.

Figure 9:
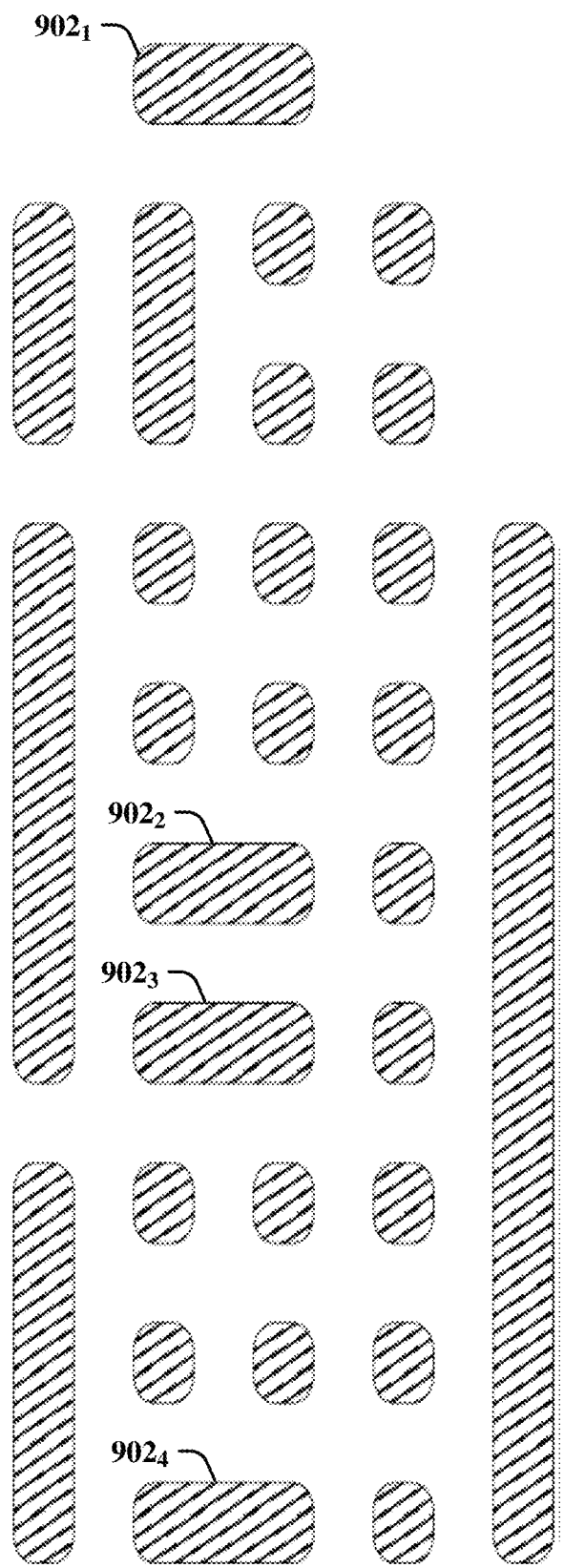
FIG. 9 illustrates an example, non-limiting representation of an example for a Model C that cannot be colored with four colors in accordance with one or more embodiments described herein.
Figure 10A:
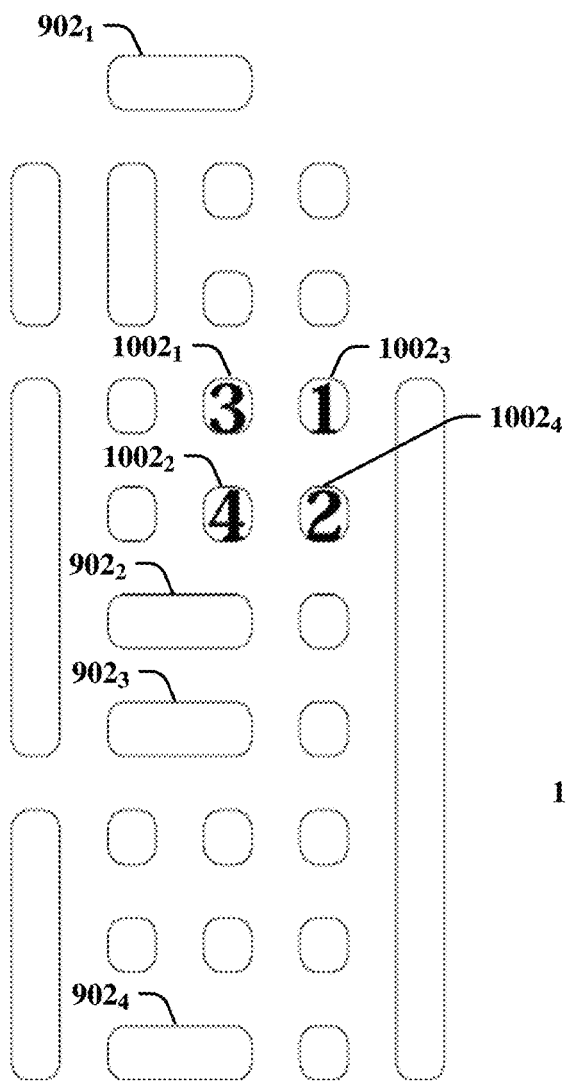
FIGS. 10A and 10B are example, non-limiting proofs of the colorability of Model C in accordance with one or more embodiments described herein.
Figure 10B:
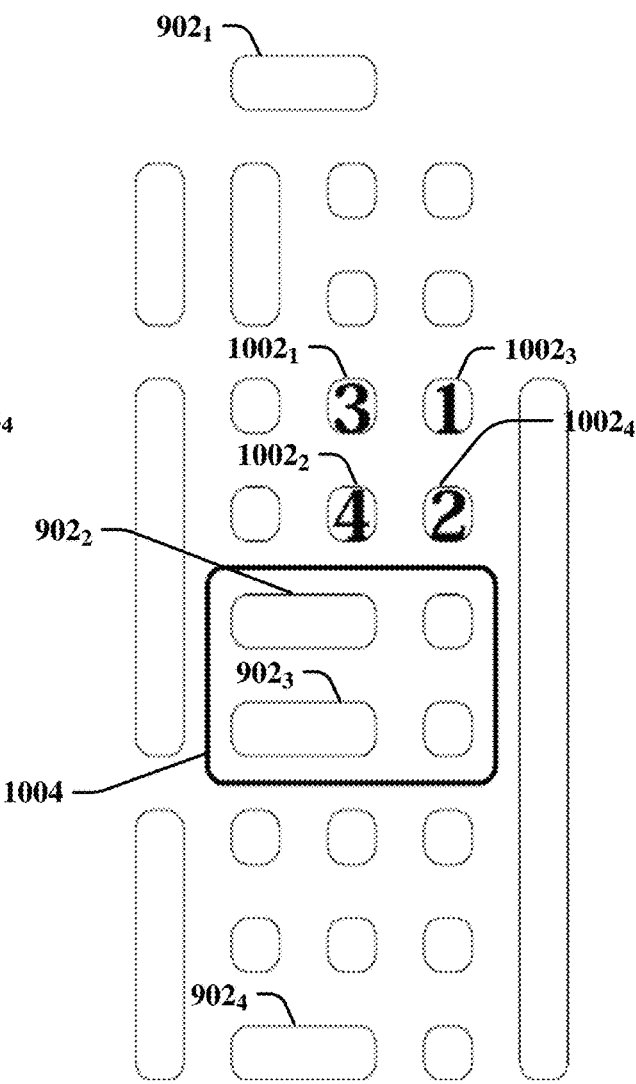

FIGS. 9-12 illustrate details with respect to another model, referred to as Model C, in accordance with one or more embodiments described herein. Model C is similar to Model A. However, as illustrated in FIG. 9, Model C allows 3×1 (width by length) horizontal rectangles $902_1$, $902_2$, $902_3$, and $902_4$ in addition to 1×n vertical rectangles (not labeled for purposes of simplicity). The following will detail the reasoning why Model C is not able to be colored with four colors (e.g., not four colorable). It is sufficient to use only four 3×1 horizontal shapes $902_1$, $902_2$, $902_3$, and $902_4$ to construct a colorable example for Model C as illustrated in FIG. 9.

The following will describe the proof for the proposition that Model C is not able to be colored with four colors as discussed herein. First color the 4-clique shown in FIG. 10A. The 4-clique comprises four vertical rectangles $1002_1$, $1002_2$, $1002_3$, and $1002_4$. Without loss of generality denote four colors by 1, 2, 3, 4, in the order shown in FIG. 10A. For example, vertical rectangle $1002_1$ is colored with color 3, vertical rectangle $1002_2$ is colored with color 3, vertical rectangle $1002_3$ is colored with color 1, and vertical rectangle $1002_4$ is colored with color 2. Then color the 4-clique 1004 circled on 10B. There are only four possibilities for coloring the 4-clique 1004 as illustrated in FIGS. 11A-11D. FIG. 11A illustrates a first possibility; FIG. 11B illustrates a second possibility; FIG. 11C illustrates a third possibility, and FIG. 11D illustrates a fourth possibility for coloring. For the four cases, continue coloring to the circled region.

For the cases in FIG. 11A and FIG. 11D, this leads to a conflict immediately For example, the circled region 1102 of FIG. 11A leads to a conflict immediately because at least one of the vertical rectangles in the circled region 1102 would be designated to be colored with color 3, which conflicts with horizontal rectangle $902_2$ or vertical rectangle $1002_1$. Accordingly, there is an immediate conflict that cannot be resolved in FIG. 11A. FIG. 11D also leads to an immediate conflict because the vertical rectangle in the circled region 1008 cannot be colored because the vertical rectangle would conflict with one of the vertical rectangles $1002_3$, $1002_4$, $1006_1$, $1006_2$. This conflict cannot be resolved.

Figure 12B:
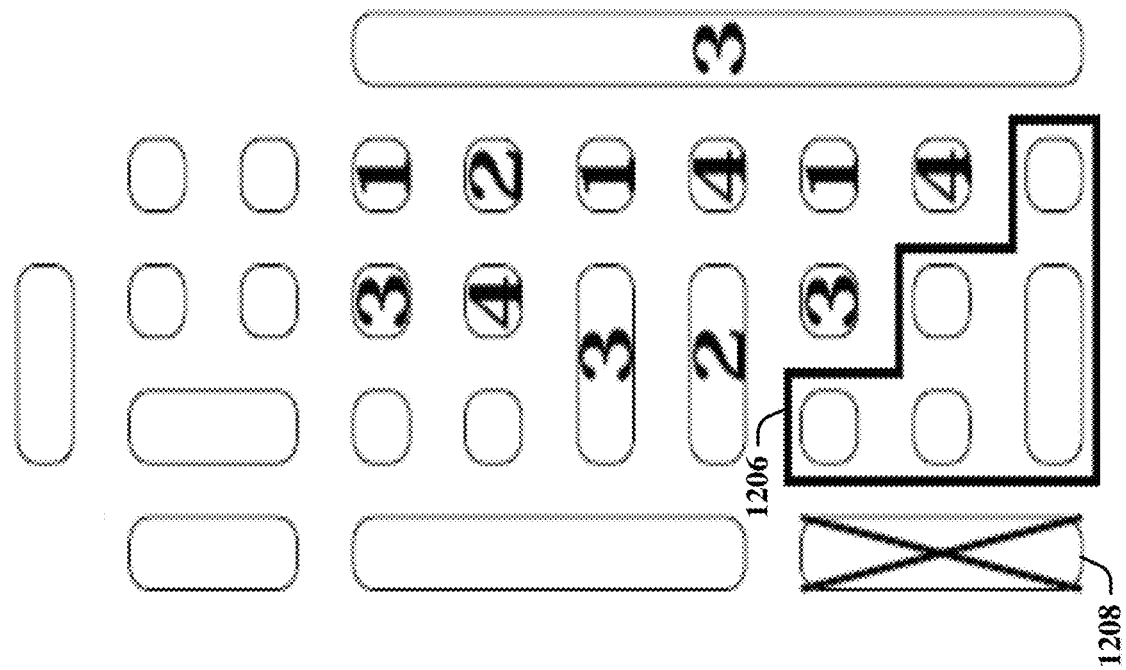
FIGS. 12A and 12B illustrate example, non-limiting alternative paths for the situation of FIG. 11B in accordance with one or more embodiments described herein.
Figure 12A:
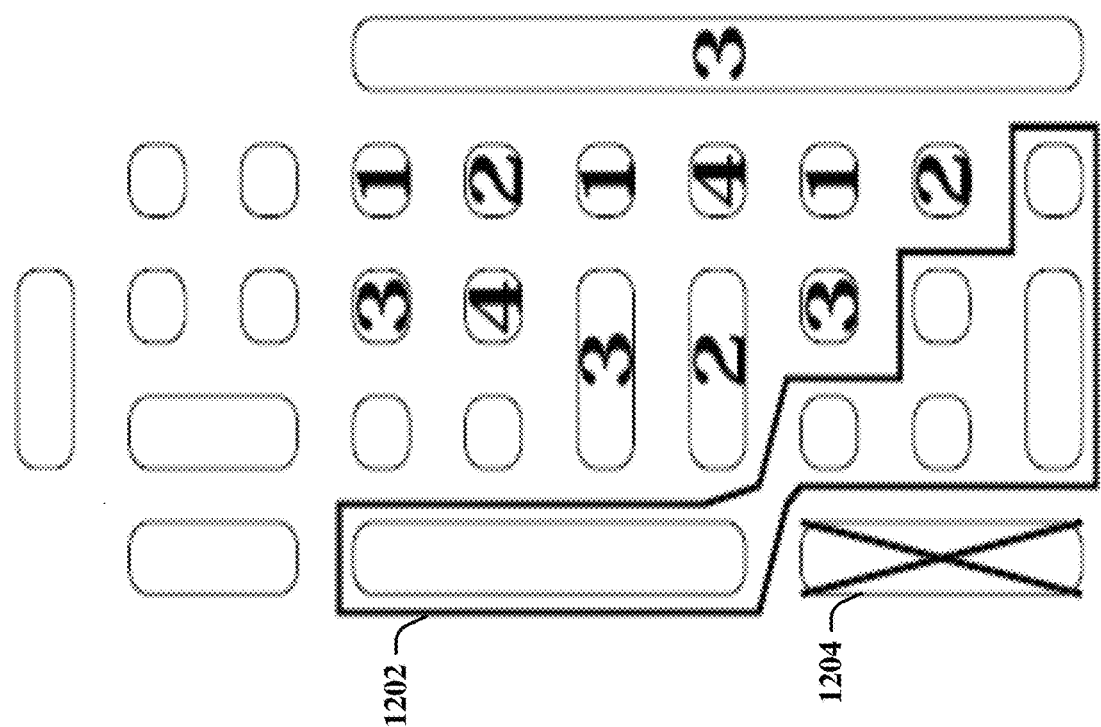

The case of FIG. 11B can fork (or diverge) into two cases and the case of FIG. 11C can fork (or diverge) into two cases. For example, coloring the circled region 1104 of FIG. 11B forks into two cases as illustrated in FIGS. 12A and 12B. Beginning with FIG. 12A, upon or after the circled region 1104 of FIG. 11B is colored, the circled region 1202 of FIG. 12A is attempted to be colored. However, the circled region 1202 is surrounded by four different colors, which renders the four coloring impossible. Therefore, vertical rectangle 1204 is crossed out and cannot be colored. In a similar manner, upon or after the circled region 1104 of FIG. 11B is colored, the circled region 1206 of FIG. 12B is attempted to be colored. However, the circled region 1206 is surrounded by four different colors, which renders the four coloring impossible. Therefore, vertical rectangle 1208 is crossed out and cannot be colored.

Further, coloring the circled region 1106 of FIG. 11C, forks into two cases as illustrated in FIGS. 12C and 12D. As illustrated in FIG. 12C, upon or after the circled region 1106 of FIG. 11C is colored, the circled region 1210 of FIG. 12C is attempted to be colored. However, the circled region 1210 is surrounded by four different colors, which renders the four coloring impossible. Therefore, vertical rectangle 1212 is crossed out and cannot be colored.

In a similar manner, upon or after the circled region 1106 of FIG. 11C is colored, the circled region 1214 of FIG. 12D is attempted to be colored. However, the circled region 1214 is surrounded by four different colors, which renders the four coloring impossible. Therefore, vertical rectangle 1216 is crossed out and cannot be colored.

Figure 13:
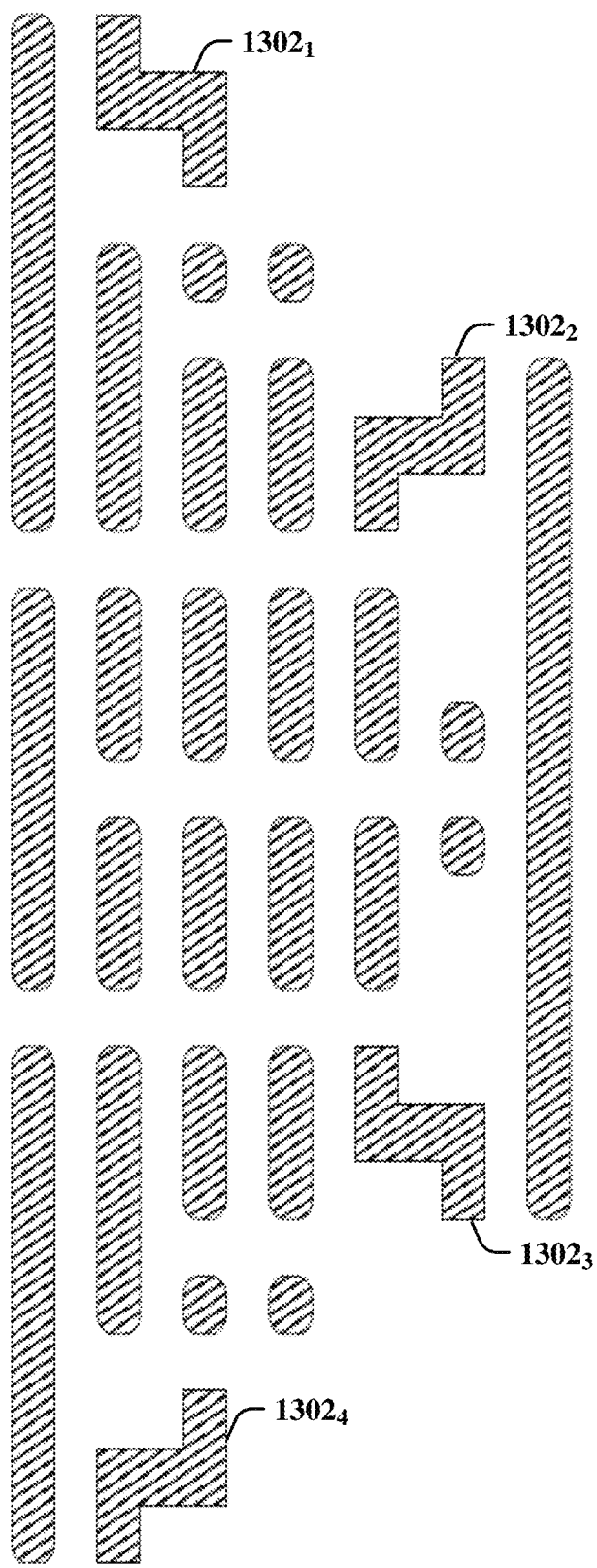
FIG. 13 illustrates an example for a Model D that cannot be colored with four colors in accordance with one or more embodiments described herein.
Figure 14A:
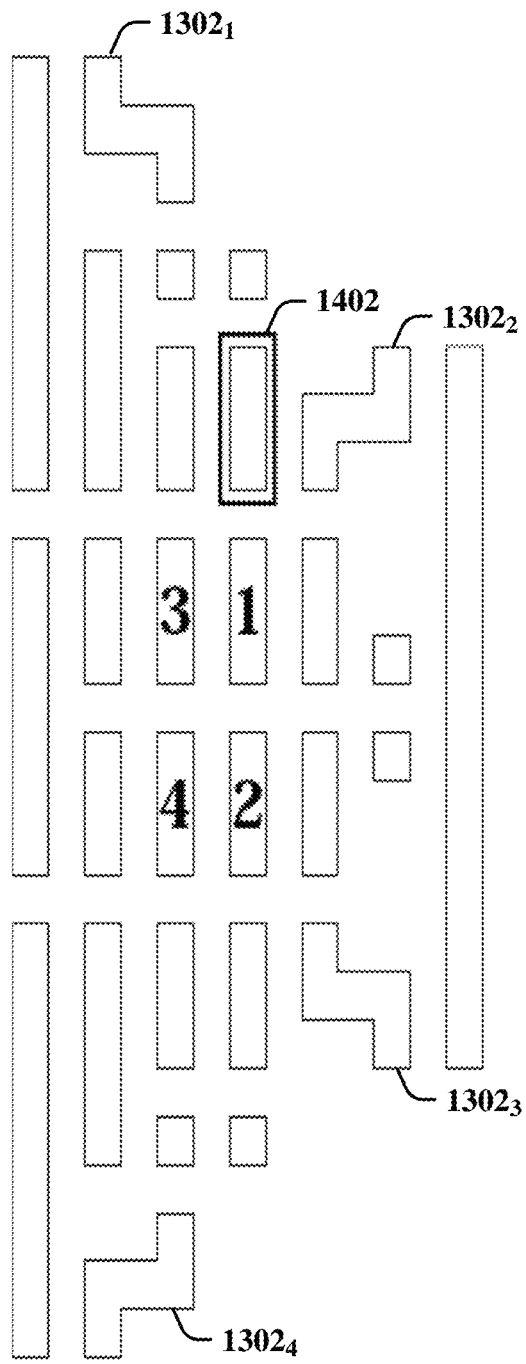
FIGS. 14A and 14B illustrate example, non-limiting coloring schemes for Model D in accordance with one or more embodiments described herein

FIGS. 13-15 illustrate another example for a Model D that is not able to be colored with four colors (e.g., not four colorable) in accordance with one or more embodiments described herein. Model D is similar to Model B but with a relaxed restriction on the position of adjacent shapes in respect to Z-shapes $1302_1$, $1302_2$, $1302_3$, $1302_4$. According to Model D, a Z-shape can be in any position in respect to its adjacent shapes as long as it has a maximum of four (same maximum as in Model B) adjacent shapes. As in Model B, the bounding boxes of all shapes should be at $1_\infty$ distance greater than or equal to one from other shapes.

Figure 14B:
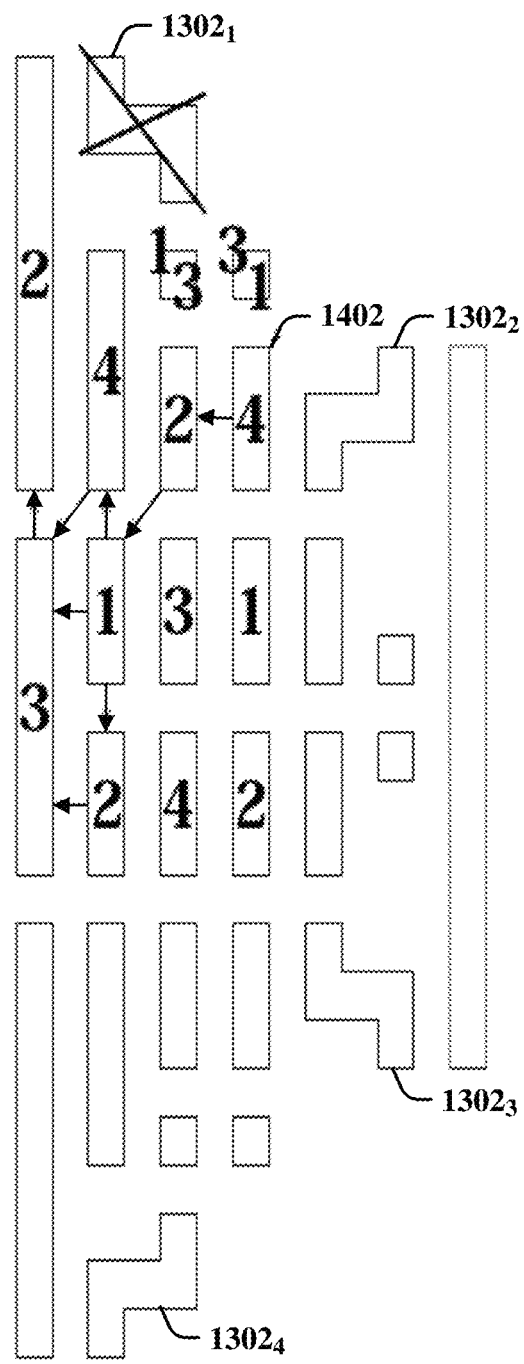
Figure 15A:
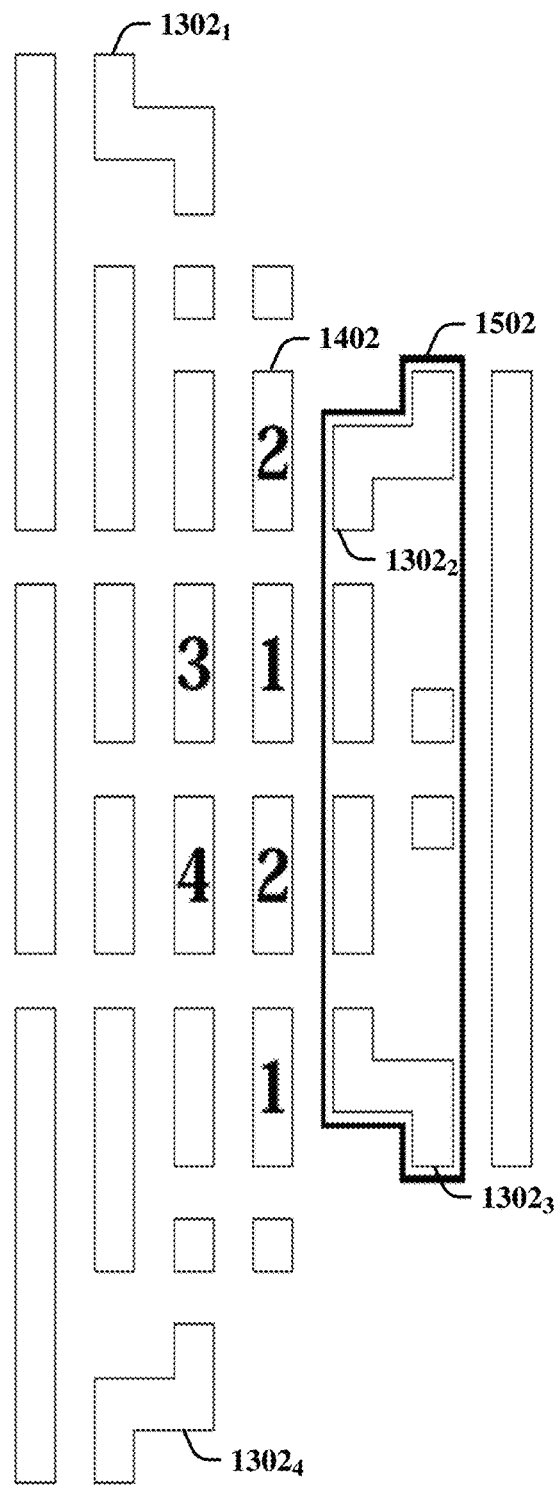
FIGS. 15A and 15B illustrate example, non-limiting options for propagating coloring into Model D in accordance with one or more embodiments described herein.

The following will illustrate that Model D is not able to be colored with four colors. The proof for this is illustrated in FIG. 13. First, color the 4-clique illustrated in FIG. 14A. Without loss of generality denote the four colors by 1, 2, 3, 4, in the order shown in FIG. 14A. Assume for the sake of contradiction that the shape 1402 circled in FIG. 14A has color 4. Then propagating colors along the arrows as illustrated in FIG. 14B leads to a conflict: the crossed Z-shape $1302_1$ cannot be colored. Therefore, the circled area on FIG. 14A (e.g., shape 1402) should have color 2, as illustrated in FIG. 15A. The horizontally symmetric shape should have color 1 because the whole design is horizontally symmetric and assuming color 3 leads to a contradiction in the symmetric way. See FIG. 15A.

Figure 15B:
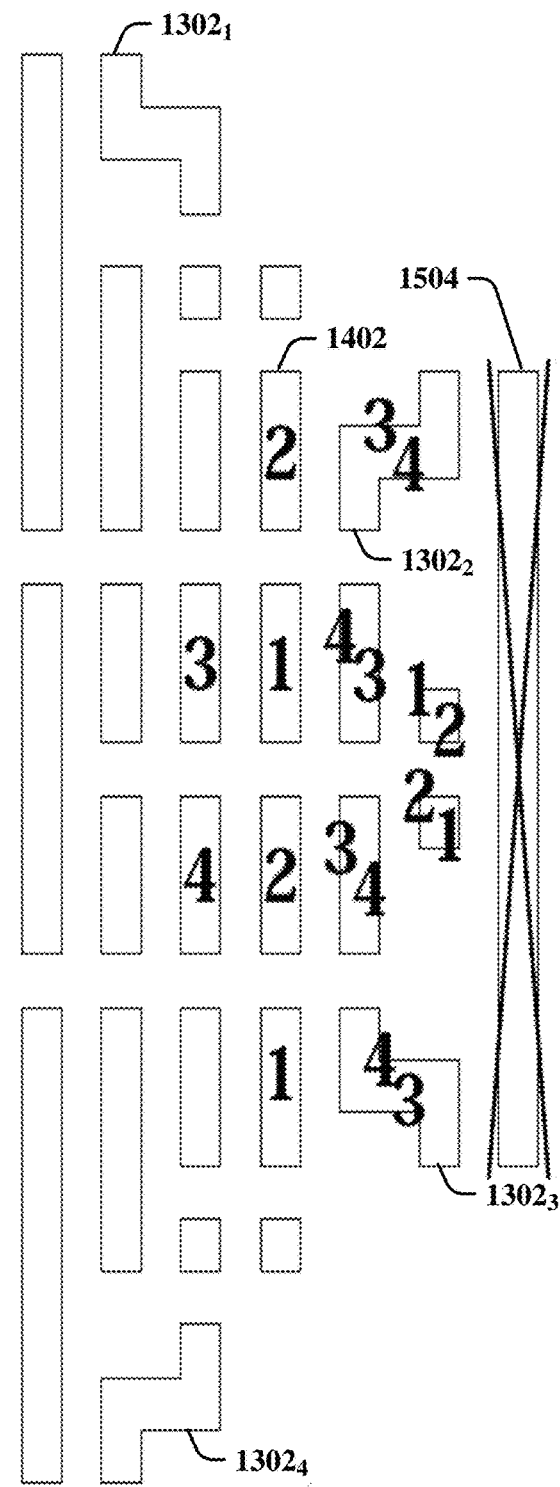

Propagate coloring into the circled region 1502. This can be performed in a number of ways as illustrated in FIG. 15B: in all ¾ pairs choose either only the upper or only the lower color and in all ½ pairs choose either only the upper or only the lower color. All these colorings lead to a conflict on the crossed shape 1504.

The following description relates to three colorability. Using only three masks instead of four provides benefits for the manufacturing process. However it is intuitively clear that design restrictions sufficient to guarantee three colorability should be much stronger than the restrictions of four colorable models such as Model A or Model B. Theoretical results regarding planar and other related graphs can be created. Unfortunately, graphs resulting from layouts contain triangles. Further, three coloring of planar graphs can be an NP-complete problem.

The following description provides a number of models (Model E through Model H) with more or less natural sets of design rule. Proceeding from Model E to Model H, the models become more restricted. For the following models, except for the last model (Model H), examples of designs that are not able to be colored with three colors (e.g., not three colorable) are provided. These examples also become more and more complex. For Model H, the three colorability is proven according to the one or more embodiments described herein.

It is first observed that if, as in Model A, adjacent shapes are defined as shapes at $l_\infty$ distance of one then any four one-by-one square shapes whose centers are located at vertexes of a two-by-two square form a four-clique as illustrated in FIG. 3. Thus, for three colorability, stricter requirements on mutual position of two shapes is introduced in order to count the two-by-two square forms adjacent. This requirement should be strict enough to prohibit diagonal interactions between shapes.

Figures 16A, 16B, 16C, 16D, 16E:
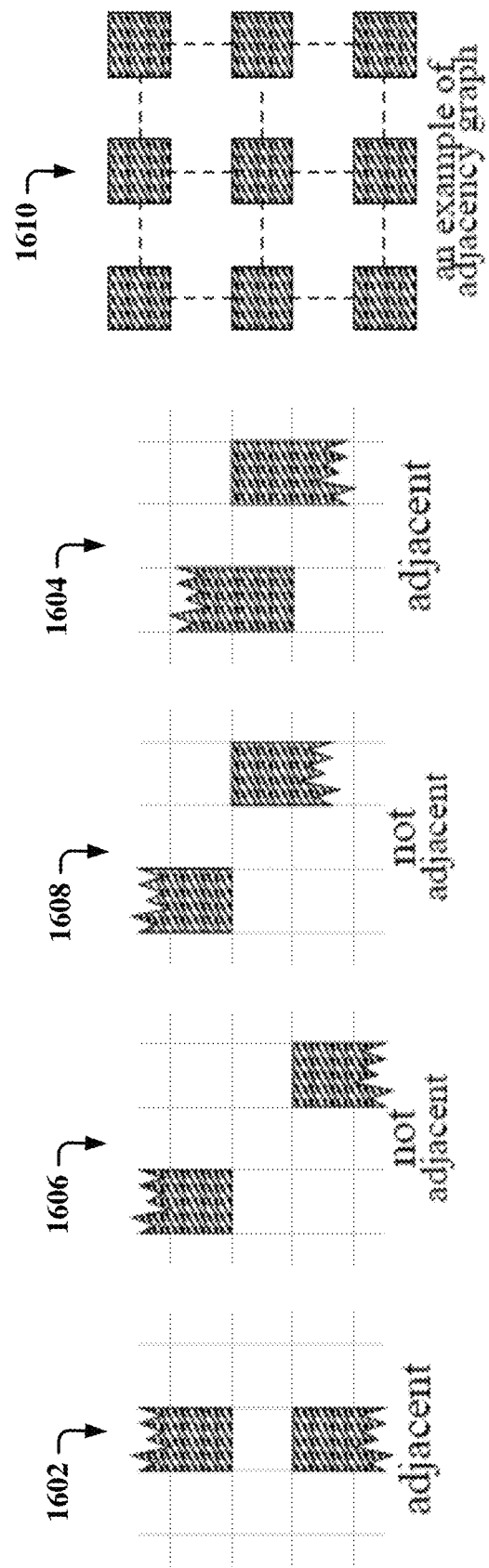
FIGS. 16A-16E illustrate examples of adjacency for models for three colorability in accordance with one or more embodiments described herein.

FIGS. 16A-16E and 17A-17C illustrate examples of three colorability according to a Model E in accordance with one or more embodiments described herein. In this model, all shapes are vertical rectangles of width one separated by space having a width of at least one, which vertexes have integer coordinates and which vertical center lines are at divisible by two distances from other shapes. Two shapes are adjacent if $l_\infty$ distance between them is equal to one and their projections on either a vertical or a horizontal axis intersect by a segment of length at least one. Some examples of adjacent and not adjacent pairs of shapes for Model E are provided in FIGS. 16A-16E. For example, adjacent pairs of shapes are illustrated at 1602 (FIG. 16A) and 1604 (FIG. 16D); not adjacent pairs are illustrated at 1606 (FIG. 16B) and 1608 (FIG. 16C), and an example of an adjacency graph is illustrated at 1610 (FIG. 16E).

Figures 17A, 17B, 17C:
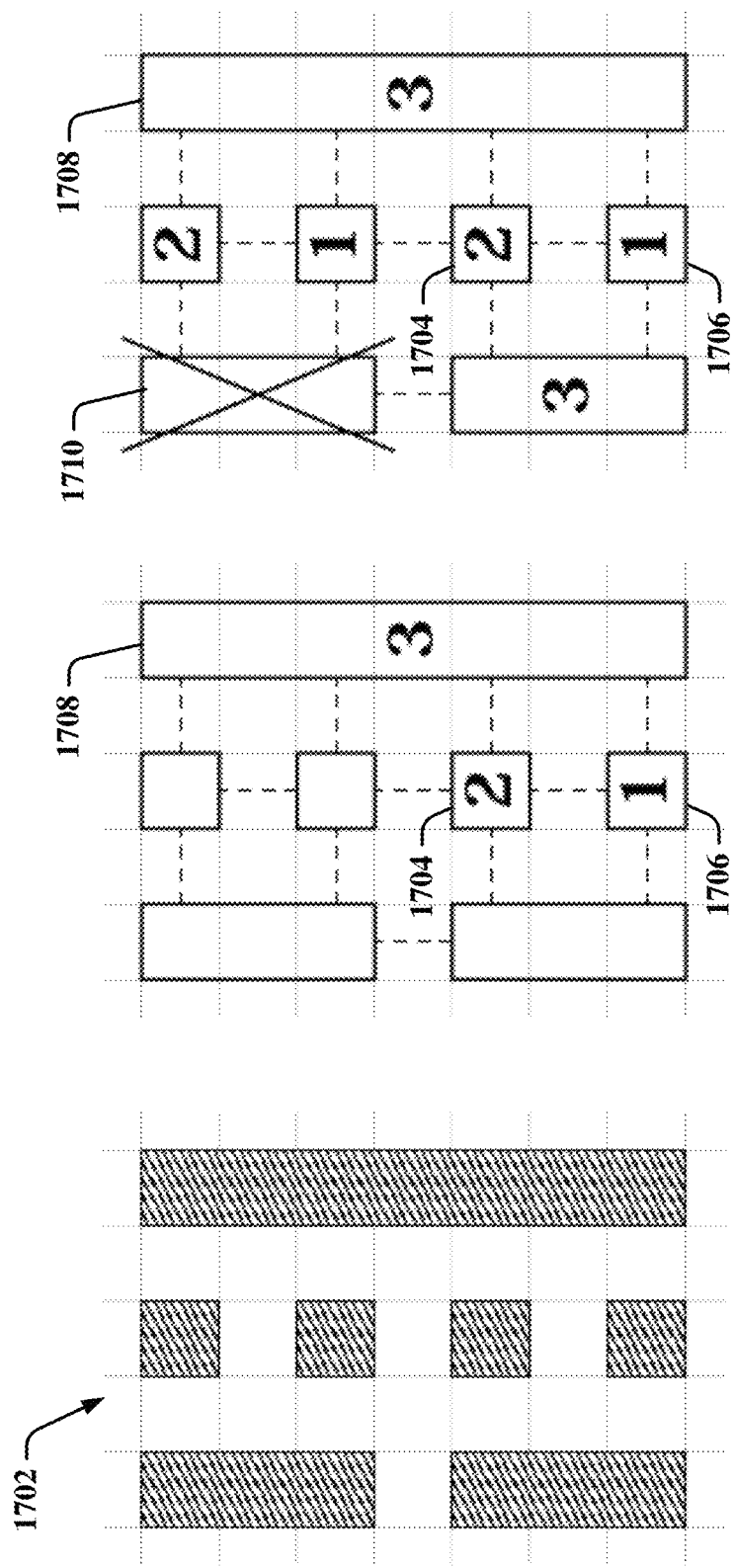
FIGS. 17A, 17B, and 17C illustrate an example for a Model E that cannot be colored with three colors in accordance with one or more embodiments described herein.

As illustrated in FIGS. 17A-17C, Model E is not able to be colored with three colors. See for example the shape layout 1702 of FIG. 17A. To prove the proposition for Model E, the following method can be utilized. The three-clique shown in FIG. 17B is colored. Without loss of generality denote the three colors by 1, 2, 3. Thus, shape 1704 is color 2, shape 1706 is color, and shape 1708 is color 3. Then the coloring shown on FIG. 17C is forced such that no shapes have a same color as an adjacent shape. Based on this, the crossed shape 1710 cannot be colored without creating a conflict.

This example is possible because coloring of a long vertical chain of small adjacent shapes is forced if the shapes are also adjacent to a long vertical shape to their left or right. Therefore, restrict Model E to exclude this situation.

FIGS. 18A-18C illustrate representations of an example for a Model F that is not able to be colored with three colors in accordance with one or more embodiments described herein. For Model F all shapes are vertical rectangles of width 1 at $l_\infty$ distance greater than or equal to one from other shapes with integer vertexes and with vertical center lines at divisible by two distances from other shapes. Two shapes can be adjacent if $l_\infty$ distance between them is 1 and their projections on either a vertical or a horizontal axis intersect by a segment of length ≥1. Further, a shape can have at most 2 shapes adjacent to it from the left. In addition, a shape can have at most 2 shapes adjacent to it from the right.

With reference to the shape layout 1802 of FIG. 18A, it will be shown that Model F is not able to be colored with three colors. The proof for this proposition can be found by coloring three-clique shown on FIG. 18B. Without loss of generality denote the three colors by 1, 2, and 3. Therefore, shape 1804 is color 1, shape 1806 is color 2, and shape 1808 is color 3. The shapes of this example form a picture resembling a wheel. Keep propagating colors going around the empty center in both clockwise and counter clockwise directions. The length of the "wheel" is chosen so that when the colorings in the two directions meet there is a color conflict on the crossed shape 1810 as illustrated in FIG. 18C. Further, restrict the model by limiting the number of vertical interactions between shapes to just one per shape. This rules out wheel-like examples.

Figure 19B:
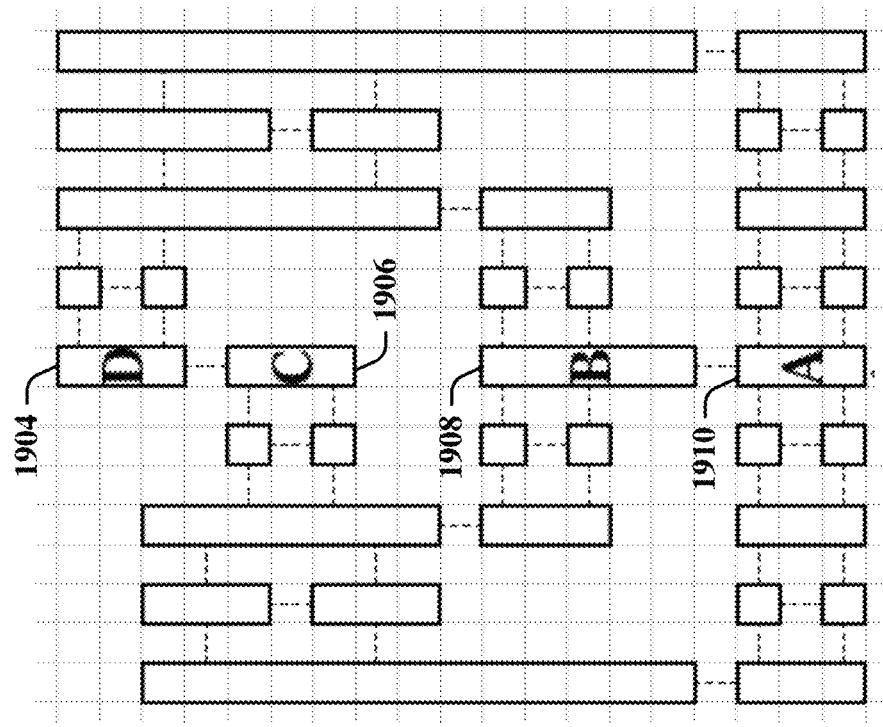
FIGS. 19A and 19B illustrate an example, non-limiting Model G that is not able to be colored with three colors in accordance with one or more embodiments described herein.
Figure 19A:
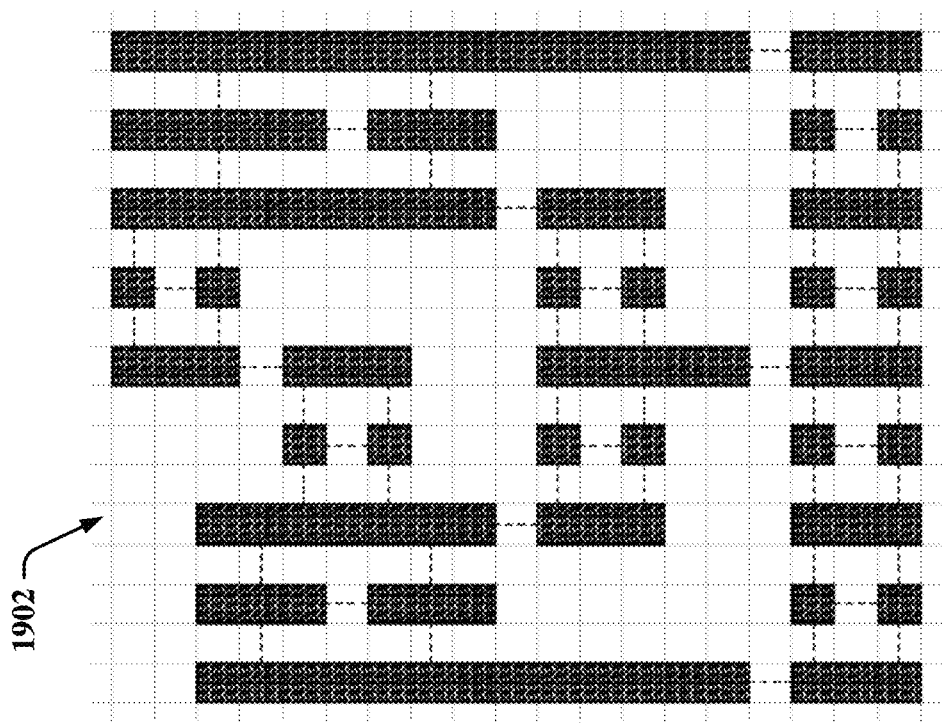
Figure 20:
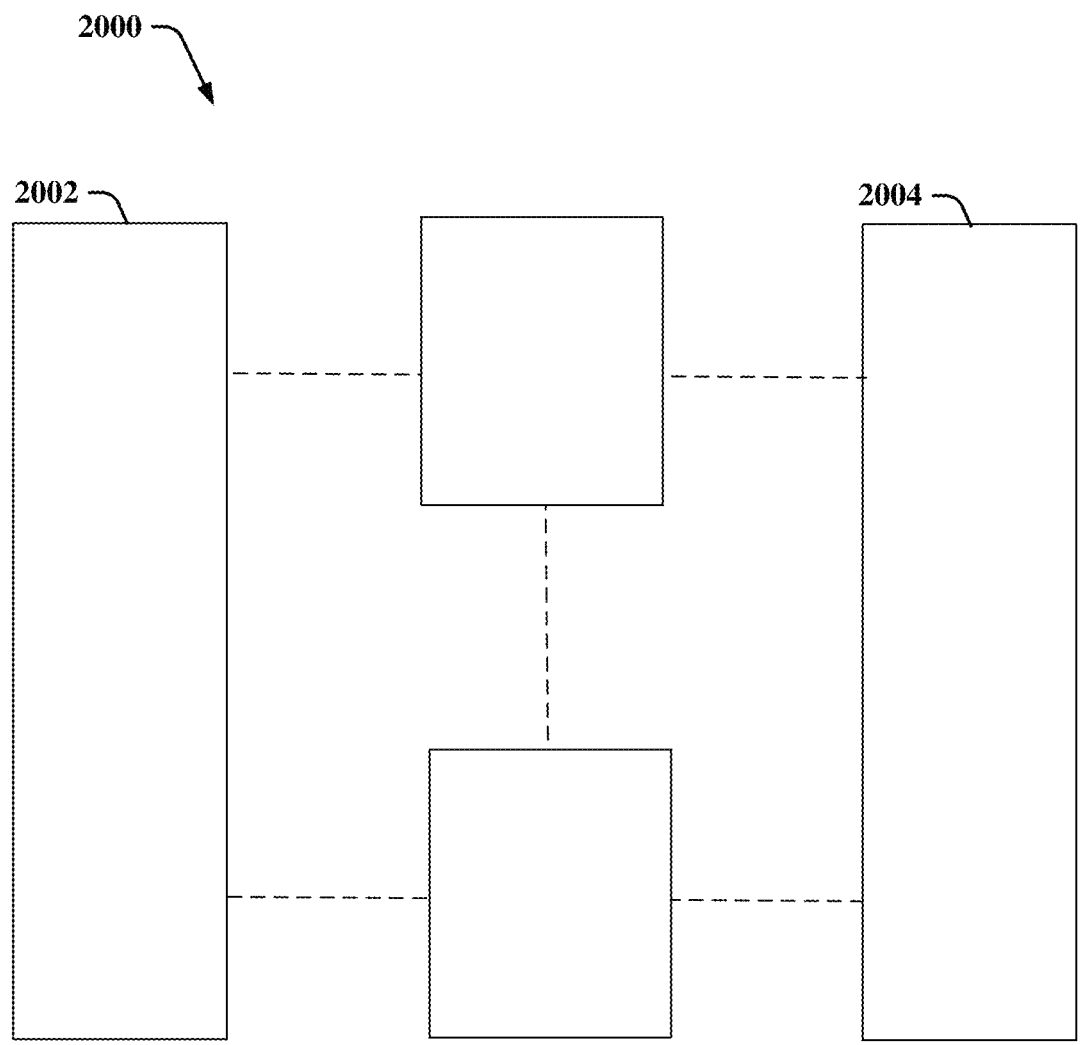
FIG. 20 illustrates an example, non-limiting configuration of a leftmost and rightmost shape for Model G in accordance with one or more embodiments described herein.

FIGS. 19-21 illustrate an example representation for a Model G that is not colorable using three colors in accordance with one or more embodiments described herein. For Model G, all shapes can be vertical rectangles of width $l_\infty$ distance equal to or greater than one from other shapes with integer vertexes and with vertical center lines at divisible by two distances from other shapes. Two shapes can be adjacent if $l_\infty$ distance between them is 1 and their projection on the vertical axis or horizontal axis intersect by a segment of length equal to or greater than one. A shape can have at most two shapes adjacent to it from the left. A shape can have at most two shapes adjacent to it from the right. Further, a shape can have at most one shape adjacent to it vertically.

As illustrated by the shape layout 1902 of FIG. 19A, Model G is not capable of being colored with three colors. However, this example is now more complex. The proof for this proposition is as follows. Color the four shapes in the central column and denote the colors by A, B, C and D. For example, as illustrated in FIG. 19B, shape 1904 is denoted with D, shape 1906 is denoted with C, shape 1908 is denoted with B, and shape 1910 is denoted with A. Note that the leftmost shape 2002 and the rightmost shape 2004 of a configuration, such as the configuration 2000 illustrated in FIG. 20, have the same color. In this manner, the colors propagate as illustrated by the shape layout 2100 in FIG. 21A.

Figure 21B:
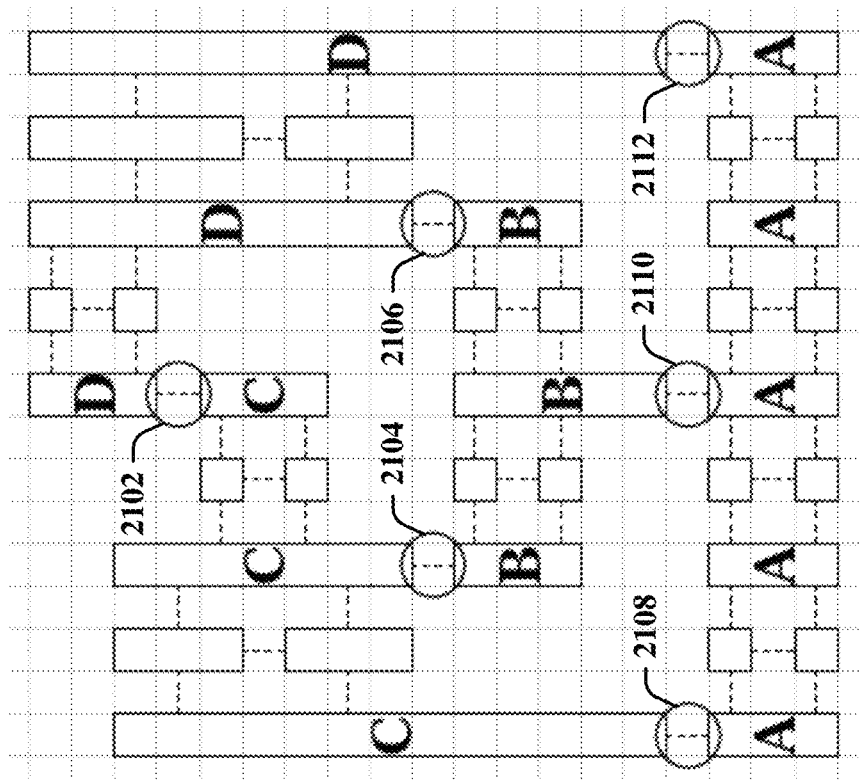
FIGS. 21A and 21B illustrate an example, non-limiting proof of the colorability of Model G in accordance with one or more embodiments described herein.
Figure 21A:
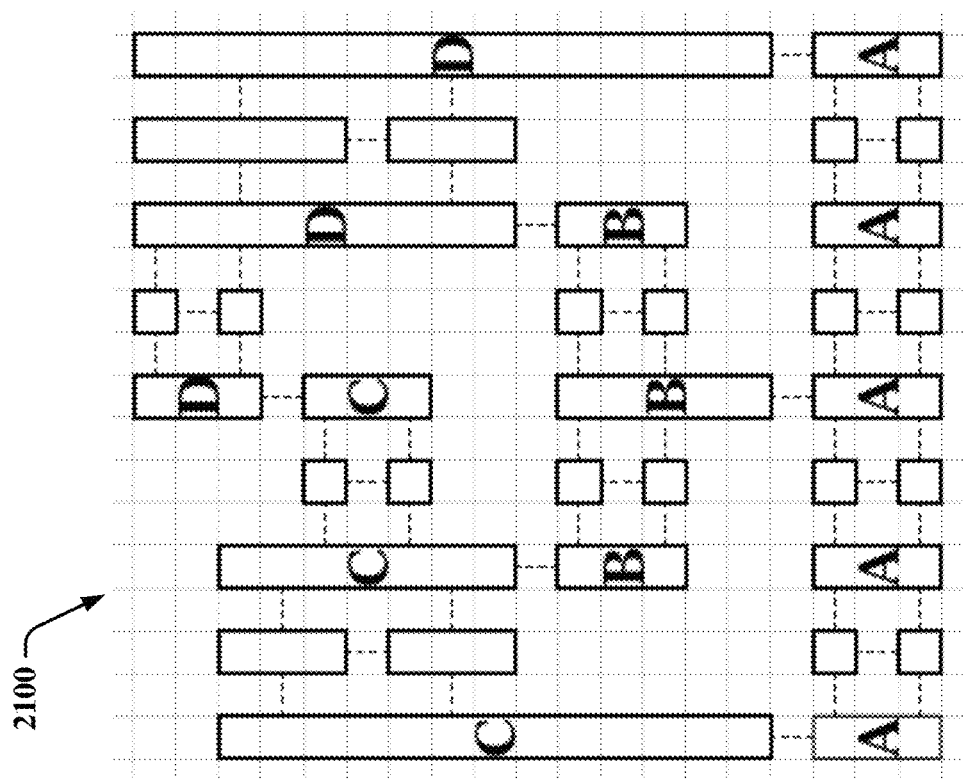

The six interactions 2102, 2104, 2106, 2108, 2110, and 2112 circled on FIG. 21B force that: A≠B; A≠C; A≠D; B≠C; B≠D; C≠D. Thus, the four colors in the central column are pair wise different. This is a contradiction.

At this point any further reduction of limits on the number of interactions (horizontal or vertical) leads to a three colorable model. If a limit on the number of vertical interactions (which is already equal to one in Model G) is reduced to zero then the model becomes two colorable as follows: just color the columns left to right in alternating order 1-2-1-2-1- . . . . If the limit on the number of interactions from one side is reduced, such as from the left, the model becomes three colorable as discussed below with respect to a Model H.

For Model H, all shapes are vertical rectangles of width 1 at $l_\infty$ distance greater than or equal to one from other shapes with integer vertexes and with vertical center lines at divisible by two distances from other shapes. Two shapes can be adjacent if $l_\infty$ distance between them is one and their projection on the vertical axis or horizontal axis intersect by a segment of length greater than or equal to one. A shape can have at most one shape adjacent to it from the left. A shape can have at most two shapes adjacent to it from the right. Further, a shape can have at most one shape adjacent to it vertically.

Therefore, Model H is three colorable and the following provides proof for this proposition. Start coloring from the shapes in the leftmost column and continue through the columns from left to right. By the restrictions of Model H a next uncolored shape is adjacent to at most two already colored shapes: at most one in its own column and at most one in the column to its left. Since there are three colors available a next uncolored shape can be colored conflict free.

As discussed herein, triple and quad coloring of various layout models has been analyzed and robust layout methodologies developed. Also discussed is a very restricted layout model (Model H), in which all layouts are triple colorable. It has also been shown that slightly more complicated layout models can yield layouts that are un-colorable when using triple patterning (Models E, F, and G). Also discussed are two layout models (Models A and B) which always result in layouts that are quad colorable with a O(n log n) time algorithm, making them suitable for practical layouts. These quad colorable layout models are particularly suitable for standard cell architectures, because their use enables worry-free placement. In the quad coloring models, small alterations to the models (Models C and D) allow for layouts that are un-colorable.

Figure 22:
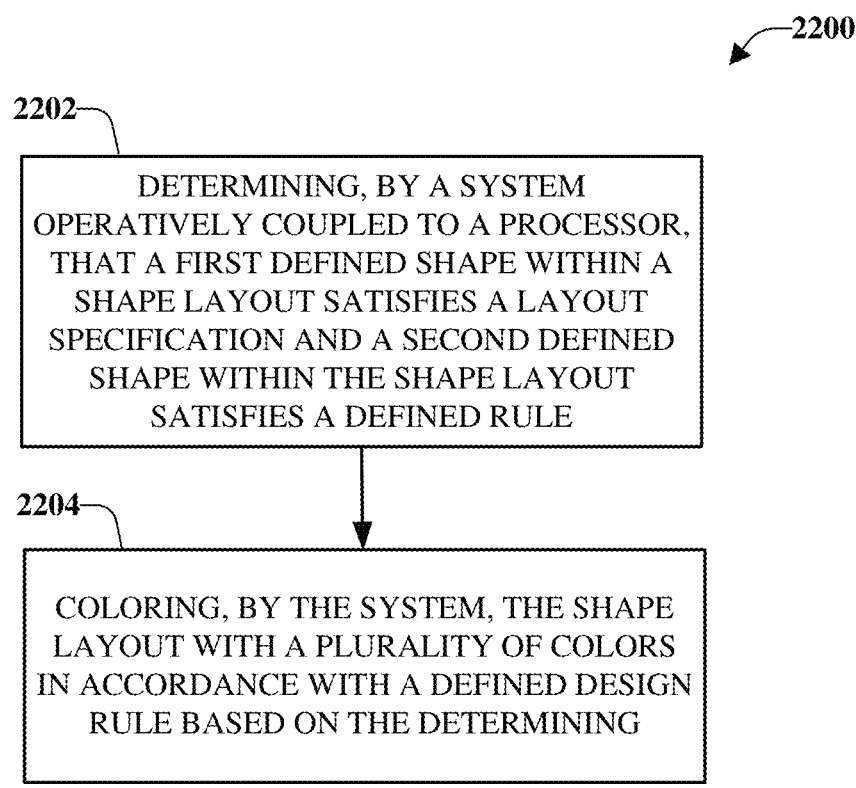
FIG. 22 illustrates a flow diagram of an example, non-limiting computer-implemented method that facilitates coloring a shape layout in accordance with one or more embodiments described herein.

FIG. 22 illustrates a flow diagram of an example, non-limiting computer-implemented method 2200 that facilitates coloring a shape layout in accordance with one or more embodiments described herein. At 2202, it is determined, by a system operatively coupled to a processor, that a first defined shape within the shape layout satisfies a layout specification and a second defined shape within the shape layout satisfies a defined rule (e.g., via the first rules component 506 and the second rules component 702). In an example, the first defined shape can be a vertical rectangle and the second defined shape can be a Z-shape. According to an implementation, vertical shapes and parts of one or more Z-shapes can be linearly ordered in columns from top to bottom.

At 2204, color, by the system, the shape layout with a plurality of colors in accordance with a defined design rule based on the determining (e.g., via the first application component 508 and the second application component 706). According to an implementation, the plurality of colors can comprise four colors.

Figure 23:
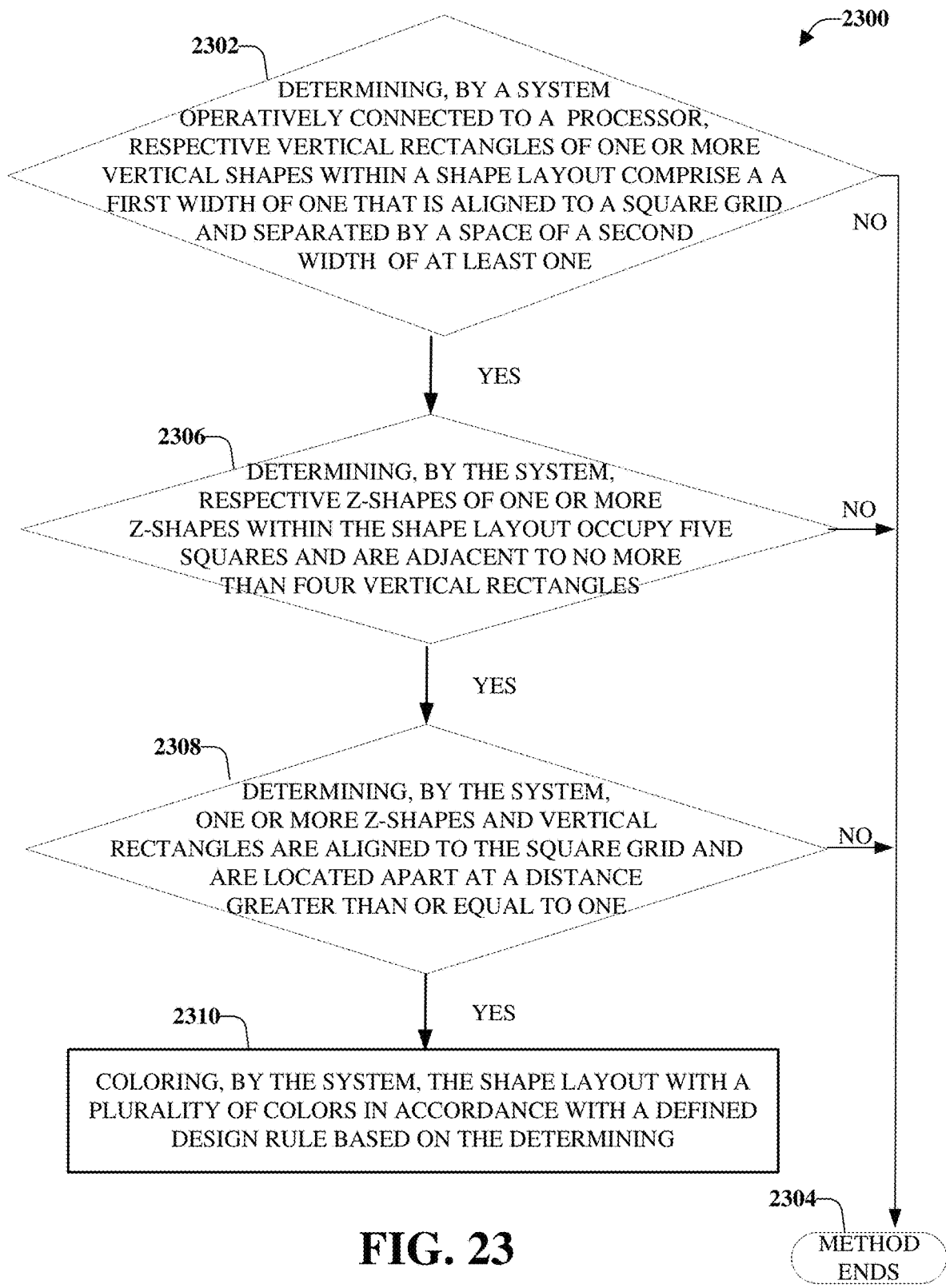
FIG. 23 illustrates a flow diagram of an example, non-limiting computer-implemented method that facilitates coloring a shape layout based on a determination that shapes within the shape layout conform to one or more rules in accordance with one or more embodiments described herein.

FIG. 23 illustrates a flow diagram of an example, non-limiting computer-implemented method 2300 that facilitates coloring a shape layout based on a determination that shapes within a shape layout conform to one or more rules in accordance with one or more embodiments described herein. The method 2300 starts, at 2302, with determining, by a system operatively coupled to a processor, respective vertical rectangles of one or more vertical shapes within the shape layout comprise a first width of one that is aligned to a square grid and separated by a space of a second width of at least one (e.g., via the first rules component 506 and the second rules component 702). If the determination is that the respective vertical rectangles do not satisfy the rule ("NO"), the method 2300 ends, at 2304 and the shape layout cannot be colored as discussed herein.

However, if the determination, at 2302, is that the respective vertical rectangles do satisfy the rule ("YES"), the method 2300 continues at 2306 with determining, by the system, respective Z-shapes of one or more Z-shapes within the shape layout occupy five squares and are adjacent to no more than four vertical rectangles (e.g., via the first rules component 506 and the second rules component 702). If the determination is that the respective Z-shapes do not conform to this rule ("NO"), the method 2300 ends at 2304. For example, two shapes can be adjacent based on a determination that a distance between the two shapes is one.

If the determination at 2304 is that the respective Z-shapes conform to the rule ("YES"), method 2300 continues at 2308 with determining, by the system, one or more Z-shapes and vertical rectangles can be aligned to the square grid and can be located apart at a distance greater than or equal to one. If not aligned ("NO"), the method 2300 ends at 2304. However, if the shapes are aligned ("YES"), at 2310, the shape layout is colored with a plurality of colors in accordance with a defined design rule (e.g., via the first application component 508 and the second application component 706).

Figure 24:
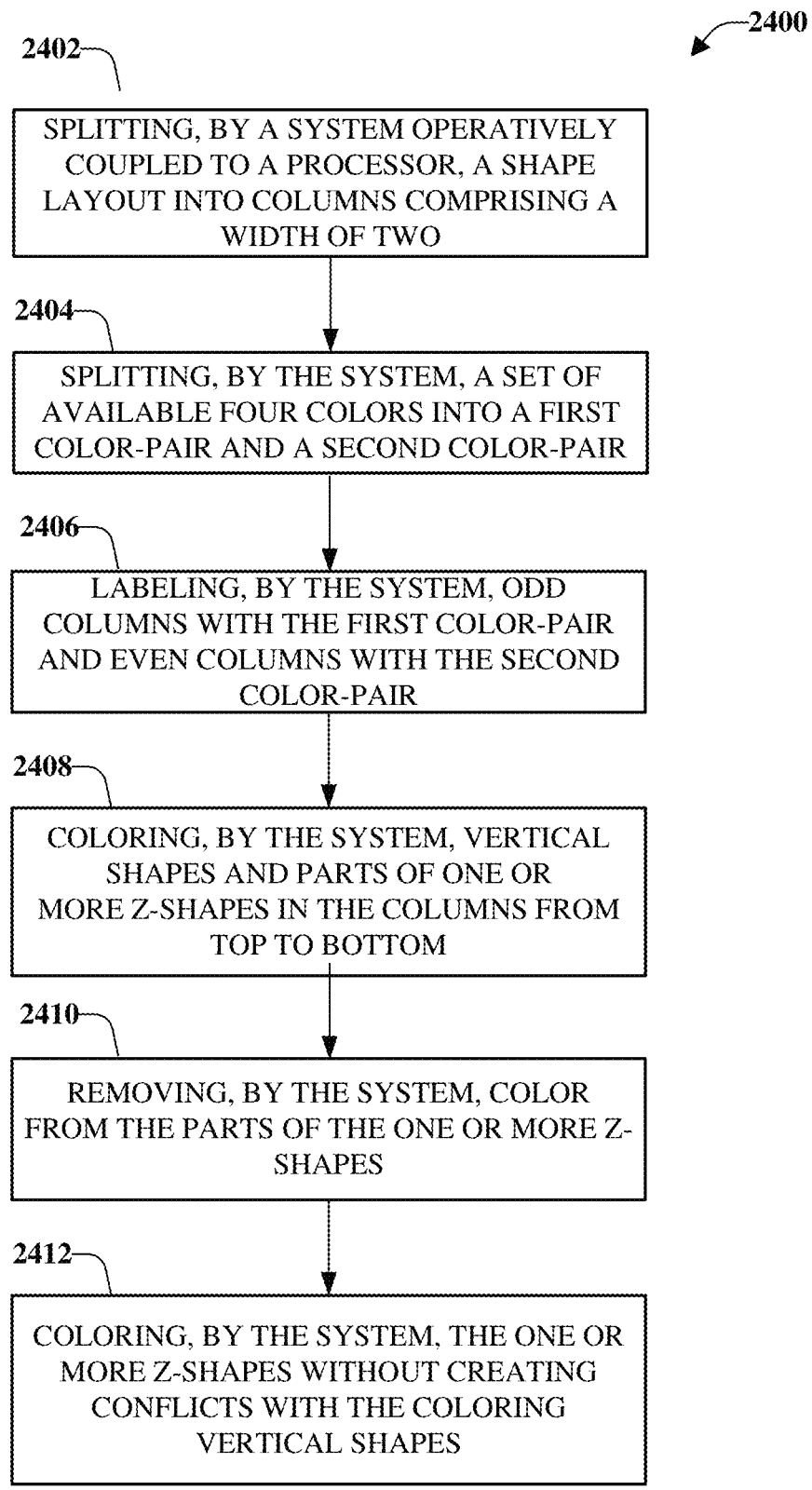
FIG. 24 illustrates a flow diagram of an example, non-limiting computer-implemented method that facilitates coloring a shape layout based on one or more rules defined for triple and quad coloring of shape layouts in accordance with one or more embodiments described herein.

FIG. 24 illustrates a flow diagram of an example, non-limiting computer-implemented method 2400 that facilitates coloring a shape layout based on one or more rules defined for triple and quad coloring of shape layouts in accordance with one or more embodiments described herein. At 2402, splitting, by a system operatively coupled to a processor, a shape layout into columns comprising a width of two (e.g., via the layout separation component 502). Note that the one or more columns can contain parts of Z-shapes and only complete vertical shapes.

At 2404, a set of available four colors can be split into a first color-pair and a second color-pair (e.g., via the assignment component 504). For example, the set of available four colors can be split into a first color-pair {1, 2} and a second color-pair {3, 4}.

At 2406, odd columns can be labeled with the first color-pair and the even columns can be labeled with the second color-pair (e.g., via the assignment component 504). For example, starting with the first column, label odd columns with {1, 2} and even columns with {3, 4}.

Further, at 2408, vertical shapes and parts of one or more Z-shapes in the columns can be colored, by the system, from top to bottom (e.g., via the first application component 508). In the one or more columns, only the colors from the column label are used to color the shapes within that column-pair. By the design rules, shapes are at least one square apart such that the shapes are linearly ordered in the one or more columns from top to bottom. The shapes are colored in the one or more columns from top to bottom using the two colors from the columns label in alternating order. For example, color a first defined shape and the parts of a second defined shape in the one or more columns from top to bottom using the two colors from the columns label in alternating order.

After the coloring, at 2410, color can be removed, by the system, from the parts of the one or more Z-shapes (e.g., via the removal component 704). After removal of the color from the one or more Z-shapes, only the vertical shapes are colored and any two consecutive vertical shapes not separated by a part of a Z-shape have different colors and any two consecutive vertical shapes separated by a part of a Z-shape have the same color. Thus, the color can be removed entirely from the Z-shapes. At 2412, the one or more Z-shapes can be colored, by the system, without creating conflicts with the coloring of the vertical shapes (e.g., via the second application component 706).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 25:
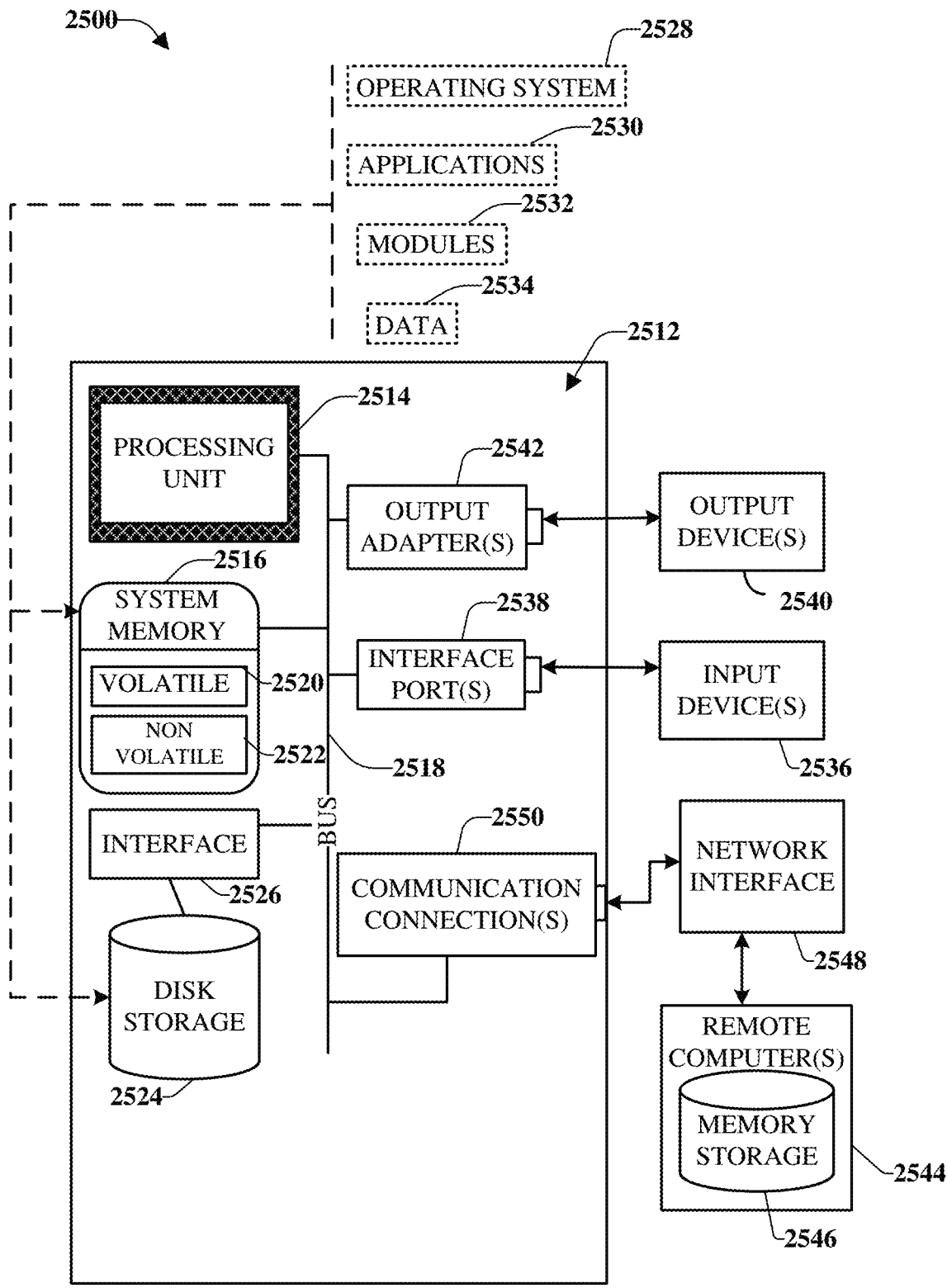
FIG. 25 illustrates a block diagram of an example, non-limiting operating environment in which one or more embodiments described herein can be facilitated.

In order to provide a context for the various aspects of the disclosed subject matter, FIG. 25 as well as the following discussion are intended to provide a general description of a suitable environment in which the various aspects of the disclosed subject matter can be implemented. FIG. 25 illustrates a block diagram of an example, non-limiting operating environment in which one or more embodiments described herein can be facilitated. Repetitive description of like elements employed in other embodiments described herein is omitted for sake of brevity. With reference to FIG. 25, a suitable operating environment 2500 for implementing various aspects of this disclosure can also include a computer 2512. The computer 2512 can also include a processing unit 2514, a system memory 2516, and a system bus 2518. The system bus 2518 couples system components including, but not limited to, the system memory 2516 to the processing unit 2514. The processing unit 2514 can be any of various available processors. Dual microprocessors and other multiprocessor architectures also can be employed as the processing unit 2514. The system bus 2518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 2516 can also include volatile memory 2520 and nonvolatile memory 2522. The basic input/output system (BIOS), containing the basic routines to transfer information between elements within the computer 2512, such as during start-up, is stored in nonvolatile memory 2522. By way of illustration, and not limitation, nonvolatile memory 2522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 2520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2512 can also include removable/non-removable, volatile/nonvolatile computer storage media. FIG. 25 illustrates, for example, a disk storage 2524. Disk storage 2524 can also include, but is not limited to, devices like a magnetic disk drive, floppy disk drive, tape drive, Jaz drive, Zip drive, LS-100 drive, flash memory card, or memory stick. The disk storage 2524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2524 to the system bus 2518, a removable or non-removable interface is typically used, such as interface 2526. FIG. 25 also depicts software that acts as an intermediary between users and the basic computer resources described in the suitable operating environment 2500. Such software can also include, for example, an operating system 2528. Operating system 2528, which can be stored on disk storage 2524, acts to control and allocate resources of the computer 2512. System applications 2530 take advantage of the management of resources by operating system 2528 through program modules 2532 and program data 2534, e.g., stored either in system memory 2516 or on disk storage 2524. It is to be appreciated that this disclosure can be implemented with various operating systems or combinations of operating systems. A user enters commands or information into the computer 2512 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2514 through the system bus 2518 via interface port(s) 2538. Interface port(s) 2538 include, for example, a serial port, a parallel port, a game port, and a universal serial bus (USB). Output device(s) 2540 use some of the same type of ports as input device(s) 2536. Thus, for example, a USB port can be used to provide input to computer 2512, and to output information from computer 2512 to an output device 2540. Output adapter 2542 is provided to illustrate that there are some output devices 2540 like monitors, speakers, and printers, among other output devices 2540, which require special adapters. The output adapters 2542 include, by way of illustration and not limitation, video and sound cards that provide a means of connection between the output device 2540 and the system bus 2518. It should be noted that other devices and/or systems of devices provide both input and output capabilities such as remote computer(s) 2544.

Computer 2512 can operate in a networked environment using logical connections to one or more remote computers, such as remote computer(s) 2544. The remote computer(s) 2544 can be a computer, a server, a router, a network PC, a workstation, a microprocessor based appliance, a peer device or other common network node and the like, and typically can also include many or all of the elements described relative to computer 2512. For purposes of brevity, only a memory storage device 2546 is illustrated with remote computer(s) 2544. Remote computer(s) 2544 is logically connected to computer 2512 through a network interface 2548 and then physically connected via communication connection 2550. Network interface 2548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2550 refers to the hardware/software employed to connect the network interface 2548 to the system bus 2518. While communication connection 2550 is shown for illustrative clarity inside computer 2512, it can also be external to computer 2512. The hardware/software for connection to the network interface 2548 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for facilitating cognitive coloring of shape layouts, the computer program product comprising a computer readable storage medium having program instructions embodied therewith, the program instructions executable by a processor to cause the processor to execute the following operations based on the computer readable storage medium stored in a memory and accessible by the processor:
    color, by a processor, a shape layout with a plurality of colors in accordance with a defined design rule based on a determination that one or more first defined shapes within the shape layout satisfy a layout specification and one or more second defined shapes within the shape layout satisfies a defined rule;
    split, by the processor, the shape layout into columns;
    split, by the processor, a set of four colors into a first color-pair and a second color-pair, wherein the first color-pair and the second color-pair comprise four different colors; and
    remove, by the processor, color from portions of the one or more second defined shapes.

2. The computer program product of claim 1, wherein the removal of the color is performed after an entirety of the shape layout is colored.

3. The computer program product of claim 1, wherein the program instructions executable by the processor further cause the processor to:
    color, by the processor, the one or more second defined shapes different from colors of adjacent ones of the one or more first defined shapes.

4. The computer program product of claim 1, wherein the program instructions executable by the processor further cause the processor to:
    label, by the processor, odd columns with the first color-pair and even columns with the second color-pair; and
    color, by the processor, vertical shapes and parts of one or more Z-shapes in the columns from top to bottom.

5. The computer program product of claim 4, wherein the program instructions executable by the processor further cause the processor to:
    remove, by the processor, color from the parts of the one or more Z-shapes; and
    color, by the processor, the one or more Z-shapes without creating conflicts with the coloring of the vertical shapes.

6. The computer program product of claim 1, wherein the shape layout are split, by the processor, into columns comprising a width of two.

7. The computer program product of claim 1, wherein the first defined shape is a vertical rectangle and the one or more second defined shapes are one or more Z-shapes.

8. A computer-implemented method comprising:
    coloring, by a device operatively coupled to a processor, a shape layout with a plurality of colors in accordance with a defined design rule based on a determination that one or more first defined shapes within the shape layout satisfy a layout specification and one or more second defined shapes within the shape layout satisfies a defined rule;
    splitting, by the device, the shape layout into columns;
    splitting, by the device, a set of four colors into a first color-pair and a second color-pair, wherein the first color-pair and the second color-pair are comprised of four different colors; and
    removing, by the device, color from portions of the one or more second defined shapes.

9. The computer-implemented method of claim 8, wherein the removal of the color is performed after an entirety of the shape layout is colored.

10. The computer-implemented method of claim 8, further comprising:
    coloring, by the device, the one or more second defined shapes different from colors of adjacent ones of the one or more first defined shapes.

11. The computer-implemented method of claim 8, further comprising:
    labeling, by the device, odd columns with the first color-pair and even columns with the second color-pair; and
    coloring, by the device, vertical shapes and parts of one or more Z-shapes in the columns from top to bottom.

12. The computer-implemented method of claim 11, further comprising:
    removing, by the device, color from the parts of the one or more Z-shapes; and
    coloring, by the device, the one or more Z-shapes without creating conflicts with the coloring of the vertical shapes.

13. The computer-implemented method of claim 8, wherein the shape layout are split, by the device, into columns comprising a width of two.

14. The computer-implemented method of claim 8, wherein the first defined shape is a vertical rectangle and the one or more second defined shapes are one or more Z-shapes.

15. The computer-implemented method of claim 8, wherein the removing the color is performed after an entirety of the shape layout is colored.

16. A system, comprising:
a memory that stores computer executable components; and
a processor that executes the computer executable components stored in the memory, wherein the computer executable components comprise:
- a first rules component that determines one or more first defined shapes in a shape layout satisfy a layout specification;
- a second rules component that determines one or more second defined shapes in the shape layout satisfy a defined rule;
- a first application component that applies coloring to the one or more first defined shapes according to a first defined design rule;
- a second application component that applies coloring to the one or more second defined shapes according to a second defined design rule, wherein the second application component colors the one or more second defined shapes different from colors of adjacent ones of the one or more first defined shapes; and
- a removal component that removes color from portions of the one or more second defined shapes, wherein removal occurs during application of the coloring on subsequent column-pairs such that a first odd column-pair and a first even column-pair are colored and then color is removed from any of the one or more second defined shapes that span between the first odd column-pair and the first even column-pair and the second odd column-pair is then colored and thereafter color is removed from any of the one or more second defined shapes that span between the first even column-pair and the second odd column-pair.

17. The system of claim 16, wherein the first rules component determines that respective first defined shapes of the one or more first defined shapes comprise a first width of one and are aligned to a square grid and separated from other shapes within the shape layout by a first space of a second width of at least one.

18. The system of claim 16, wherein the second rules component determines that respective second defined shapes of the one or more second defined shapes occupy five square and are adjacent to more than four first defined shapes of the one or more first defined shapes.

* * * * *